US012723690B1

(12) United States Patent
Abraham Carabano et al.

(10) Patent No.: US 12,723,690 B1

(45) Date of Patent: *Sep. 1, 2026

(54) COMPACT FLUID COUPLINGS

(71) Applicant: Colder Products Company, Roseville, MN (US)

(72) Inventors: Andres E. Abraham Carabano, Otsego, MN (US); Shaun J. Jacobsen, Minneapolis, MN (US); Erik A.M. Weigel, Minneapolis, MN (US)

(73) Assignee: Colder Products Company, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/461,033

(22) Filed: Jan. 27, 2026

Related U.S. Application Data

(63) Continuation of application No. 19/459,509, filed on Jan. 26, 2026, which is a continuation of application No. 19/458,228, filed on Jan. 23, 2026, which is a continuation of application No. 18/652,113, filed on May 1, 2024, which is a continuation of application No. 17/849,855, filed on Jun. 27, 2022, now Pat. No. 12,007,055.

(60) Provisional application No. 63/219,942, filed on Jul. 9, 2021.

(51) Int. Cl.

| | |
|---|---|
| ***F16L 37/35*** | (2006.01) |
| ***F16L 33/30*** | (2006.01) |
| ***F16L 37/086*** | (2006.01) |
| ***F16L 37/34*** | (2006.01) |
| ***F16L 37/53*** | (2006.01) |

(52) U.S. Cl.

CPC ............ *F16L 37/35* (2013.01); *F16L 37/086* (2013.01); *F16L 37/53* (2013.01); *F16L 33/30* (2013.01); *F16L 37/34* (2013.01); *Y10T 137/87949* (2015.04)

(58) Field of Classification Search

CPC ..... Y10T 137/87957; Y10T 137/87949; Y10T 137/87941; F16L 37/0841; F16L 37/088; F16L 37/1225; F16L 37/144; F16L 37/30; F16L 37/32; F16L 37/34; F16L 37/35; F16L 37/36; F16L 43/001; F16L 43/005

See application file for complete search history.

(56) References Cited

U.S. PATENT DOCUMENTS

| | | | |
|---|---|---|---|
| 1,364,147 | A | 1/1921 | Spahr |
| 2,325,271 | A | 7/1943 | Paul |
| 2,854,259 | A | 9/1958 | Clark |

(Continued)

FOREIGN PATENT DOCUMENTS

| | | |
|---|---|---|
| CN | 201795206 U | 4/2011 |
| CN | 207112176 U | 3/2018 |

(Continued)

OTHER PUBLICATIONS

Extended European Search Report in European Appln No. 228382453, dated Jul. 9, 2024, 8 pages.

(Continued)

*Primary Examiner* — Robert K Arundale

(74) *Attorney, Agent, or Firm* — Fish & Richardson P.C.

(57) ABSTRACT

Some fluid coupling devices described herein are configured as non-spill fluid couplings. In addition, some embodiments described in this document relate to fluid coupling devices and fluid coupling systems that are constructed in a compact configuration.

20 Claims, 14 Drawing Sheets

(56) References Cited

U.S. PATENT DOCUMENTS 3,334,659 A 8/1967 Magorien
3,344,811 A 10/1967 Hoffmann
3,446,245 A 5/1969 Clifford
3,450,424 A 6/1969 Calisher
3,625,251 A 12/1971 Nelson
4,079,966 A 3/1978 Berry et al.
4,327,770 A 5/1982 Brown et al.
4,340,052 A 7/1982 Dennehey et al.
4,447,040 A 5/1984 Magorian
4,541,457 A 9/1985 Blenkush
4,575,262 A 3/1986 Andersen
4,672,998 A 6/1987 Kozak, III
4,696,323 A 9/1987 Iff
D298,605 S 11/1988 Colgan et al.
4,875,711 A 10/1989 Watanabe
4,892,117 A 1/1990 Spalink
4,919,457 A 4/1990 Moretti
4,934,655 A 6/1990 Blenkush
4,936,345 A 6/1990 Nix
D309,774 S 8/1990 Lewis
D313,067 S 12/1990 Kotake et al.
4,991,627 A 2/1991 Nix
5,018,352 A 5/1991 Compton
5,052,725 A 10/1991 Meyer
5,104,158 A 4/1992 Meyer et al.
5,113,657 A 5/1992 Compton et al.
5,139,049 A 8/1992 Jensen et al.
5,215,122 A 6/1993 Rogers et al.
5,292,157 A 3/1994 Rubichon
5,293,902 A 3/1994 Lapierie
5,316,041 A 5/1994 Ramacier, Jr. et al.
5,337,782 A 8/1994 Wilcox
5,339,862 A 8/1994 Haunhorst
5,482,083 A 1/1996 Jenski
5,494,073 A 2/1996 Saito
5,494,074 A 2/1996 Ramacier et al.
5,546,985 A 8/1996 Bartholomew
5,703,243 A 12/1997 Nishitani et al.
5,709,243 A 1/1998 Wells et al.
D396,730 S 8/1998 Schaupp
5,911,403 A 6/1999 deCler et al.
5,938,244 A 8/1999 Meyer
5,975,489 A 11/1999 deCler et al.
D419,860 S 2/2000 Persson
6,024,124 A 2/2000 Braun et al.
6,082,399 A 7/2000 Nyberg
6,082,401 A 7/2000 Braun et al.
6,095,190 A 8/2000 Wilcox et al.
6,116,277 A 9/2000 Wilcox et al.
6,176,263 B1 1/2001 Lacroix et al.
6,231,089 B1 5/2001 deCler et al.
6,283,151 B1 9/2001 Countryman et al.
6,328,348 B1 12/2001 Cornford et al.
6,386,596 B1 5/2002 Olson
D468,016 S 12/2002 Mosler et al.
6,517,121 B1 2/2003 Cresswell
6,681,803 B2 1/2004 Taneya et al.
6,685,230 B1 2/2004 Bottura
D494,256 S 8/2004 Nortier
6,802,399 B2 10/2004 Niebling et al.
7,044,161 B2 5/2006 Tiberghien
7,063,357 B1 6/2006 Bay
7,185,674 B2 3/2007 Taylor
7,213,845 B2 5/2007 Sato
7,434,842 B2 10/2008 Schmidt
7,469,472 B2 12/2008 deCler et al.
7,547,047 B2 6/2009 deCler et al.
7,568,737 B2 8/2009 Wells et al.
D602,128 S 10/2009 Williams
D608,424 S 1/2010 Katsuta et al.
D610,760 S 2/2010 Zugen et al.
7,708,029 B2 5/2010 Kitagawa et al.
7,828,336 B2 11/2010 Gammons
7,980,599 B2 7/2011 Schindel
D648,008 S 11/2011 Percoco et al.
D654,573 S 2/2012 Lombardi et al.
8,201,853 B2 6/2012 Tiberghien et al.
D679,784 S 4/2013 Meyer
D687,528 S 8/2013 Meyer
8,590,860 B2 11/2013 Kitagawa
8,764,068 B2 7/2014 Frick et al.
8,870,235 B2 10/2014 Turk
8,899,284 B2 12/2014 Hemingway
8,910,980 B2 12/2014 Neal et al.
D730,495 S 5/2015 Umehara
9,157,560 B2 10/2015 Rehder et al.
9,263,752 B2 2/2016 Zimmermann et al.
D752,721 S 3/2016 Wildfang et al.
D758,555 S 6/2016 Van Dyke et al.
D761,395 S 7/2016 Plackner et al.
D788,890 S 6/2017 Downs et al.
9,689,516 B2 6/2017 Frick et al.
D816,191 S 4/2018 Cove
D816,211 S 4/2018 Guala
D830,523 S 10/2018 Vranish
D830,524 S 10/2018 Vranish
D838,350 S 1/2019 Downs et al.
D879,250 S 3/2020 Vranish
D896,929 S 9/2020 Vranish
D896,930 S 9/2020 Vranish
D898,878 S 10/2020 Sprenger
D912,202 S 3/2021 Takezawa
11,060,650 B2 7/2021 Vranish
11,067,210 B2 7/2021 Vranish
11,079,052 B2 8/2021 Vranish
D953,495 S 5/2022 Banks
D1,010,776 S 1/2024 Ingram
11,885,451 B2 1/2024 Vranish
D1,016,251 S 2/2024 Castriotta
D1,020,986 S 4/2024 Del Piero
D1,031,948 S 6/2024 Clevenger
12,025,256 B2 7/2024 Vranish
D1,043,924 S 9/2024 Sprenger
12,123,531 B1 10/2024 Vranish
12,129,952 B1 10/2024 Vranish
D1,068,039 S 3/2025 Gao
12,359,759 B2 7/2025 Vranish
D1,088,195 S 8/2025 Vranish
12,442,477 B2 10/2025 Vranish
12,455,030 B2 10/2025 Vranish
12,455,031 B2 10/2025 Vranish
12,486,936 B2 12/2025 Vranish
D1,108,588 S 1/2026 Vranish
2005/0001425 A1 1/2005 deClear et al.
2005/0241641 A1 11/2005 Fletcher
2006/0217671 A1 9/2006 Peppel
2007/0029796 A1 2/2007 Bibby
2007/0035129 A1 2/2007 Chappaz
2007/0120361 A1 5/2007 Kao
2008/0157525 A1 7/2008 Yoshino
2008/0185056 A1 8/2008 Diodati
2009/0167018 A1 7/2009 Lien
2010/0019487 A1 1/2010 deCler et al.
2010/0051129 A1 3/2010 Kitagawa
2011/0067225 A1 3/2011 Bassaco
2013/0092271 A1 4/2013 Downs et al.
2013/0192797 A1 8/2013 Tiberghien et al.
2013/0192800 A1 8/2013 Tiberghien et al.
2014/0060675 A1 3/2014 Wilhelms et al.
2014/0261819 A1 9/2014 Vranish
2015/0090915 A1 4/2015 Vranish
2015/0114500 A1 4/2015 Von Keitz
2015/0267851 A1 9/2015 Aoki
2016/0010772 A1 1/2016 Tiberghien et al.
2016/0305589 A1 10/2016 Wildfang et al.
2017/0241581 A1 8/2017 Decker
2018/0149298 A1 5/2018 Kim
2020/0063904 A1 2/2020 Vranish
2020/0063905 A1 2/2020 Vranish
2021/0140572 A1 5/2021 Sung
2021/0199223 A1 7/2021 Langer
2021/0324988 A1 10/2021 Vranish
2023/0358353 A1 11/2023 Schroter
2024/0159342 A1 5/2024 Vranish

(56) References Cited

U.S. PATENT DOCUMENTS

| | | | |
|---|---|---|---|
| 2024/0167604 | A1 | 5/2024 | Vranish |
| 2024/0353043 | A1 | 10/2024 | Vranish |
| 2024/0360939 | A1 | 10/2024 | Vranish |
| 2024/0360941 | A1 | 10/2024 | Vranish |
| 2024/0360942 | A1 | 10/2024 | Vranish |
| 2025/0065668 | A1 | 2/2025 | Raves |
| 2025/0122965 | A1 | 4/2025 | Vranish |
| 2025/0297699 | A1 | 9/2025 | Vranish |
| 2025/0361964 | A1 | 11/2025 | Vranish |
| 2025/0369547 | A1 | 12/2025 | Vranish |

FOREIGN PATENT DOCUMENTS

| | | |
|---|---|---|
| DE | 102020211212 | 9/2020 |
| EP | 2623835 | 8/2013 |
| EP | 2623916 | 8/2013 |
| FR | 3099809 | 2/2021 |
| GB | 2393770 | 4/2004 |
| JP | D1734638 | 1/2023 |

OTHER PUBLICATIONS

International Search Report and Written Opinion in International Appln. No. PCT/US2022/35063, mailed on Oct. 6, 2022, 11 pages.

430
434
432

430
436

COMPACT FLUID COUPLINGS

CROSS-REFERENCE TO RELATED APPLICATIONS

This application is a continuation application of U.S. application Ser. No. 19/459,509 filed on Jan. 26, 2026, which is a continuation application of U.S. application Ser. No. 19/458,228 filed on Jan. 23, 2026, which is a continuation application of U.S. application Ser. No. 18/652,113 filed on May 1, 2024, which is a continuation application of U.S. application Ser. No. 17/849,855 filed on Jun. 27, 2022, which claims the benefit of U.S. Provisional Application Ser. No. 63/219,942 filed on Jul. 9, 2021. The disclosures of the prior applications are considered part of (and are incorporated by reference in) the disclosure of this application.

BACKGROUND

1. Technical Field

This document relates to fluid coupling devices for fluid systems and methods of their use. For example, some embodiments described in this document relate to fluid coupling devices that are configured as non-spill fluid couplings and that are constructed in a compact configuration.

2. Background Information

Fluid systems commonly include components such as tubing, pumps, reservoirs, fittings, couplings, heat exchangers, sensors, filters, valves, seals, and the like. Such components can be connected together in a network to define one or more fluid flow paths.

Fluid coupling assemblies typically include a female coupling device and a male coupling device that are releasably connected to each other create a fluid flow path therethrough. Such coupling assemblies can be used in various applications, including biomedical applications, beverage dispensing, instrument connections, photochemical handling, liquid cooling, ink handling, and others.

In the context of some fluid systems, such as a fluid system for liquid cooling of electronics, it may be desirable to use non-spill couplings that have minimal or zero fluid spillage during connection and disconnection of the male and female couplings. Such non-spill couplings will serve to limit the exposure of the electronics to the fluid that could damage the electronics, for example. Such non-spill couplings can also serve to limit air inclusion during the coupling process.

SUMMARY

This document describes fluid coupling devices for fluid systems and methods of their use. For example, some embodiments described in this document relate to fluid coupling devices that are configured as non-spill fluid couplings and that are constructed in a compact configuration.

In the context of this disclosure, the term “fluid” means any substance that can be made to flow including, but is not limited to, liquids, gases, granular or powdered solids, mixtures or emulsions of two or more fluids, suspensions of solids within liquids or gases, vapors, steam, mists, gels, semi-solids, etc.

The fluid coupling devices described herein may also be referred to herein as male and female couplings, “coupling halves,” and/or “connectors.” The male couplings may also be referred to herein as “inserts,” and the female couplings may also be referred to herein as “bodies.”

In some embodiments described herein, the fluid coupling devices described herein have a modular construction. That is, one or both of the coupling halves can include a core module that can be used in various types of fluid coupling outer bodies. In some embodiments, the core module includes a valve and one or more fluid seals.

In particular embodiments, the fluid coupling devices described herein are specifically designed with one or more mechanical components to configure the devices as “non-spill” coupling devices. The devices described herein are referred to as non-spill coupling devices because as the male and female portions of the coupling devices are being connected to each other and/or disconnected from each other, the designs of the fluid coupling devices will reduce the likelihood of fluid discharge out of the fluid system (for example, by blocking as such discharge paths) and by preventing spillage related to fluid inclusion within the fluid coupling devices. Accordingly, contamination of the surrounding environment can be prevented, and the addition of air into the fluid system as the couplings are connected to each other can be minimized.

In one aspect, this disclosure is related to a fluid coupling device that includes a housing that defines an internal space and a valve assembly disposed within the internal space. The housing comprises a first housing portion that defines a first internal space portion and a first end opening; a second housing portion that defines a second internal space portion and a second end opening; and a third housing portion coupled to the first and second housing portions, the third housing portion defining a third internal space portion. The valve assembly includes a valve stem and a valve sleeve. The valve assembly is reconfigurable between: (i) a first arrangement in which a fluid flow path between the first and second end openings is open, and (ii) a second arrangement in which the valve assembly blocks the fluid flow path. The third housing portion is disposed at a closed end of the fluid coupling device.

Such a fluid coupling device may optionally include one or more of the following features. The valve assembly may be within the first internal space portion. A first portion of the fluid flow path may extend through the first internal space portion. A second portion of the fluid flow path may extend through the second internal space portion. A third portion of the fluid flow path may extend through the third internal space portion. The third portion of the fluid flow path may interconnect the first and second portions of the fluid flow path. In some embodiments, a cross-section of the third internal space portion taken orthogonally to an axial direction of the third portion of the fluid flow path is rectangular. An area of the rectangular cross-section of the third internal space may decrease along a direction from an end of the third housing portion that is connected to the first housing portion to an end of the third housing portion that is connected to the second housing portion. In some embodiments, the fluid flow path between the first and second end openings is U-shaped. The first and second end openings may both face in a same direction away from the closed end of the fluid coupling device. The first internal space portion may extend along a first axis. The second internal space portion may extends along a second axis. The third internal space portion may extends along a third axis. The first axis may be spaced apart from and parallel to the second axis. The first axis may be orthogonal to the third axis. The second axis may be orthogonal to the third axis. The first and second axes may be spaced apart from each other and may be each orthogonal to the third axis.

In another aspect, this disclosure is directed to a fluid coupling system that includes a first fluid coupling device and a second fluid coupling device that is releasably coupleable to the first fluid coupling device. The first fluid coupling device includes a housing defining an internal space and a valve assembly within the internal space. The housing includes a first housing portion that defines a first internal space portion and a first end opening; a second housing portion that defines a second internal space portion and a second end opening; and a third housing portion coupled to the first and second housing portions, the third housing portion defining a third internal space portion. The valve assembly includes a valve stem and a valve sleeve that is spring-biased to a closed position. The second fluid coupling device includes a housing defining an internal space, and a valve assembly within the internal space. The valve assembly includes a valve member that is spring-biased to a closed position. The first and second fluid coupling devices are releasably coupleable in a coupled arrangement by inserting a portion of the housing of the second fluid coupling device into the first internal space portion via the first end opening to open the valve assemblies of the first and second fluid coupling devices and to create an open fluid flow path through the fluid coupling system.

Such a fluid coupling system may optionally include one or more of the following features. The fluid coupling system may also include a latch member coupled to the first housing portion. The latch member may be configured to releasably latch the first and second fluid coupling devices in the coupled arrangement. The open fluid flow path through the first fluid coupling device may be U-shaped. The open fluid flow path through the second fluid coupling device may be L-shaped.

Particular embodiments of the subject matter described in this document can be implemented to realize one or more of the following advantages. First, some embodiments of the fluid coupling devices provide an improved non-spill connection and disconnection capability that may advantageously reduce or eliminate fluid spillage in some cases. As such, these embodiments of the fluid coupling devices described herein may be well-suited, for example, for use in fluid systems that provide liquid cooling to electronics such as computers and the like. Another benefit from the non-spill design of the fluid couplings described herein is the minimization of the inclusion of air into the fluid system as the couplings are connected to each other.

Second, in some embodiments the fluid couplings are advantageously constructed in a compact manner. Such a compact configuration can be beneficial for applications that have a limited amount of space for the fluid couplings to be installed. Installations of the fluid couplings for fluid cooling of computer electronics can be one example of such an application.

Third, some embodiments of the fluid coupling devices provided herein are advantageously designed with a robust latching system. That is, when the two halves of the coupling are operably connected with each other to provide a fluid flow path therethrough, they are also mechanically locked together. In some embodiments, a wire clip latch member is used to provide the mechanical lock. In some embodiments, to release the lock and separate the two halves of the coupling, the wire clip latch member must first be removed, or a thumb latch must be depressed first. This latching system may reduce the likelihood of unintentional disconnections.

Fourth, in some embodiments, the fluid coupling devices may advantageously provide an indication of the temperature of the fluid inside of the coupling by comprising a color-changing material (e.g., a thermochromic polymer) which is responsive to temperature. In some embodiments, other techniques for indicating the temperature of the fluid can be used such as, but not limited to, color-changing adhesive labels applied to an outer surface of the coupling(s).

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION OF ILLUSTRATIVE EMBODIMENTS

Figure 1:
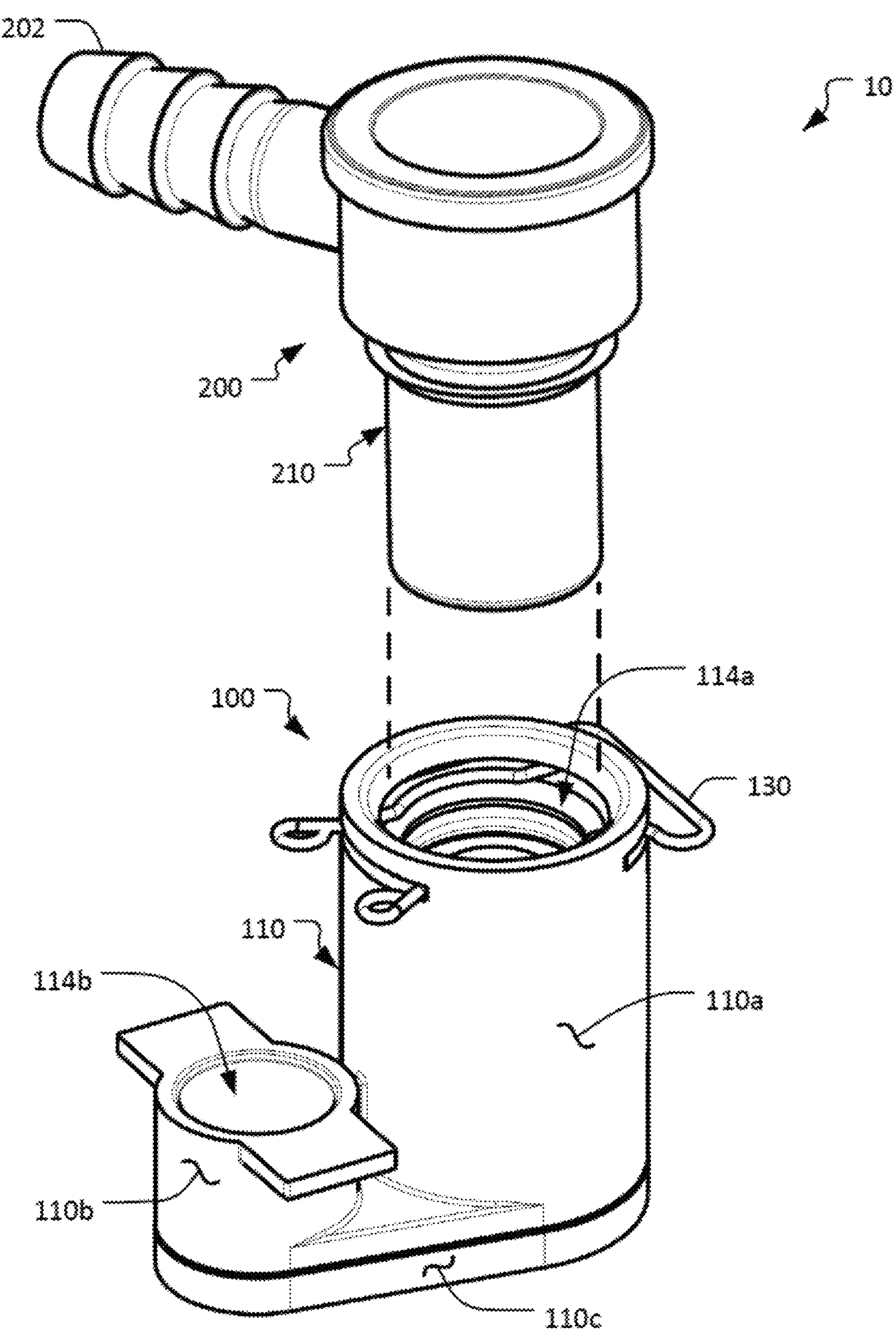
FIG. 1 is a perspective view of a fluid coupling assembly including an example male fluid coupling device and an example female coupling device arranged in a separated configuration, in accordance with some embodiments provided herein.

Referring to FIG. 1, some example embodiments of a fluid coupling system 10 include a female coupling device 100 and a male coupling device 200 that are releasably coupleable to each other. The female coupling device 100 may also be referred to as a body 100 or a first fluid coupling device 100. The male coupling device 200 may also be referred to as an insert 200 or a second fluid coupling device 200.

The female coupling device 100 includes a housing 110. The housing 110 includes a first housing portion 110*a*, a second housing portion 110*b*, and a third housing portion 110*c*. Each of the housing portions 110*a-c* defines an internal space.

The third housing portion 110*c* is coupled to the first housing portion 110*a* and second housing portion 110*b*. The third housing portion 110*c* extends between the first housing portion 110*a* and second housing portion 110*b*. The third housing portion 110*c* is disposed at a closed end of the fluid coupling device 100.

The male coupling device 200 includes a housing 210.

The first housing portion 110*a* defines a first end opening 114*a*. The second housing portion 110*b* defines a second end opening 114*b*. In the depicted embodiment, the first end opening 114*a* and the second end opening 114*b* both face in a same direction away from the third housing portion 110*c* (which is a closed end of the fluid coupling device 100).

The first end opening 114*a* is configured to receive a portion of the housing 210 of the male coupling device 200 when the female coupling device 100 and the male coupling device 200 are releasably coupled to each other in an operable configuration that creates an open fluid flow path through the female coupling device 100 and the male coupling device 200. When the female coupling device 100 and the male coupling device 200 are uncoupled from each other (as shown in FIG. 1) there is no open fluid flow path through either of the female coupling device 100 or the male coupling device 200. That is the case because each of the female coupling device 100 and the male coupling device 200 have internal valves that are biased to closed arrangements (as described further below).

The second end opening 114*b* of the female coupling device 100 is a connection point (or "termination" 114*b*) that can be used to couple the female coupling device 100 to various types of fluid-carrying members (e.g., a tube, a manifold, a pipe, a rail, a fitting, etc.). In the depicted embodiment, the second end opening 114*b* is simply an open port. In some embodiments, an adapter (e.g., a nipple, a spud, a threaded portion, a hose barb, a compression fitting, etc.) can be used to connect the chosen type of fluid-carrying member to the female coupling device 100 via the second end opening 114*b*.

The male coupling device 200 includes a connection point 202 (or "termination" 202) that can be used to couple the male coupling device 200 to various types of fluid-carrying members (e.g., a tube, a manifold, a pipe, a rail, a fitting, etc.). In the depicted embodiment, the connection point 202 is a barbed termination. In other embodiments, the connection point 202 can be any other type of termination such as, but not limited to, a threaded portion, a compression fitting, a sanitary fitting, a luer fitting, and the like, without limitation).

While the termination 114*b* of the female coupling device 100 is depicted as an open port, and the termination 202 of the male coupling device 200 is depicted as a barbed connection, it should be understood that the female coupling device 100 and/or the male coupling device 200 can have any type of connections/terminations such as, but not limited to, threaded connections, elbows, tees, sanitary fittings, compression fittings, and the like, and combinations thereof.

The materials from which one or more of the components of the fluid coupling system 10 are made of include thermoplastics and/or thermosets. In particular embodiments, the materials from which the components of the fluid coupling system 10 are made of are thermoplastics, such as, but not limited to, acetal, ABS, polycarbonate, polysulfone, polyether ether ketone, polysulphide, polyester, polyvinylidene fluoride (PVDF), polyethylene, Perfluoropolymers (PFA, PTFE, PCTFE and the like), polyphenylsulfone (PPSU; e.g., Radel®), polyetherimide (PEI; e.g., Ultem®), polypropylene, polyphenylene, polyaryletherketone, Perfluoropolymers (PFA, PTFE, PCTFE and the like) and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling system 10 are made of include metals such as, but not limited to stainless steel, brass, aluminum, plated steel, zinc, and the like. In particular embodiments, one or both of the female coupling device 100 and the male coupling device 200 is/are metallic-free. In some embodiments, one or both of the female coupling device 100 and the male coupling device 200 includes one or more plastic (e.g., PEEK, PPS, etc.) or metallic spring members (e.g., PEEK, PPS, etc.) or metallic spring members (e.g., spring steel, stainless steel such as 316L, piano/music wire, beryllium copper, titanium, Hastelloy®, Inconel®, and the like). In some embodiments, such spring members can be made an elastomeric material.

In certain embodiments, fluid coupling system 10 includes one or more gaskets or seals that are made of materials such as, but not limited to, silicone, fluoroelastomers (FKM), ethylene propylene diene monomer (EPDM), perfluoroelastomers (e.g., FFKM, Kalrez®, Chemraz® and the like), thermoplastic elastomers (TPE), buna, buna-N, thermoplastic vulcanizates (TPV), and the like. In some embodiments, the gaskets or seals can have a cross-sectional shape that is an hourglass-shape, an oval shape, a circular shape, D-shaped, X-shaped, square, rectangular, U-shaped, L-shaped, V-shaped, a polygonal shape, a multi-lobe shape, or any other suitable shape, without limitation.

In some embodiments, the couplings or portions thereof can be constructed from a color-changing material (e.g., a thermochromic polymer) that is responsive to temperature. Accordingly, the color of such a coupling can provide an indication of the temperature of the fluid inside of the coupling. In some embodiments, other techniques for indicating the temperature of the fluid can be used such as, but not limited to, color-changing adhesive labels applied to an outer surface of the coupling(s).

It should be understood that the components of the fluid coupling system 10 (e.g., the female coupling device 100 and the male coupling device 200) are scalable to virtually any desired size. Accordingly, the fluid coupling system 10 can be scaled to connect a wide range of different conduits or tubing sizes from very small conduits/tubing (e.g., 3 mm in diameter or smaller) to very large conduits/tubing (e.g., 50 mm in diameter or larger).

Figure 2:
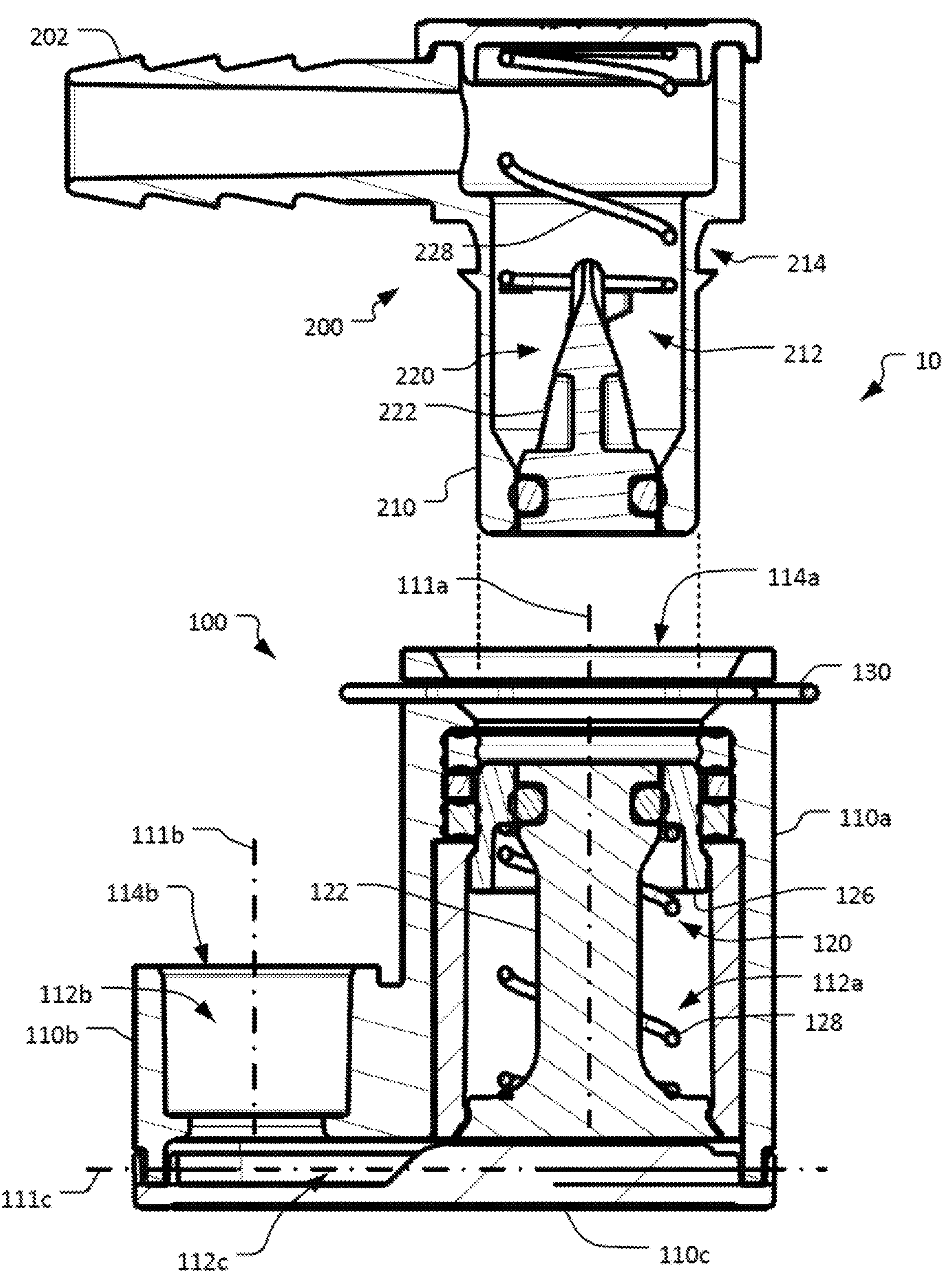
FIG. 2 is a longitudinal cross-sectional view of the fluid coupling assembly of FIG. 1.

FIG. 2 shows longitudinal cross-sectional views of the female coupling device 100 and the male coupling device 200. In these views, it can be seen that the female coupling device 100 includes a valve assembly 120 and the male coupling device 200 includes a valve assembly 220. In the depicted arrangements, the valve assembly 120 and the valve assembly 220 are each in a closed arrangement in which the valve assembly 120 and the valve assembly 220 block fluid flow through the female coupling device 100 and the male coupling device 200, respectively.

As described above, the female coupling device 100 includes the first housing portion 110*a*, the second housing portion 110*b*, and the third housing portion 110*c*. Now in FIG. 2, it can be seen that the first housing portion 110*a* defines a first internal space portion 112*a* that extends along a first axis 11*a*. The second housing portion 110*b* defines a second internal space portion 112*b* that extends along a second axis 111*b*. The third housing portion 110*c* defines a third internal space portion 112*c* that extends along a third axis 111*c* (also refer to FIG. 5). The third internal space portion 112*c* fluidly interconnects the first internal space portion 112*a* and the second internal space portion 112*b*. In other words, when the valve assembly 120 is in its open configuration, the first end opening 114*a* and the second end opening 114*b* are in fluid communication via a series combination of the first internal space portion 112*a*, the second internal space portion 112*b*, and the third internal space portion 112*c*.

It can be seen that in the depicted embodiment, the first axis 11*a* is orthogonal to the third axis 111*c*. In addition, the second axis 111*b* is orthogonal to the third axis 111*c*. Further, in the depicted embodiment the first axis 111*a* and the second axis 111*b* are spaced apart from each other, are parallel to each other, and are each orthogonal to the third axis 111*c*. In other words, when the valve assembly 120 is in its open configuration, it can be said that the fluid flow path between the first end opening 114*a* and the second end opening 114*b* is "U-shaped."

Figure 4:
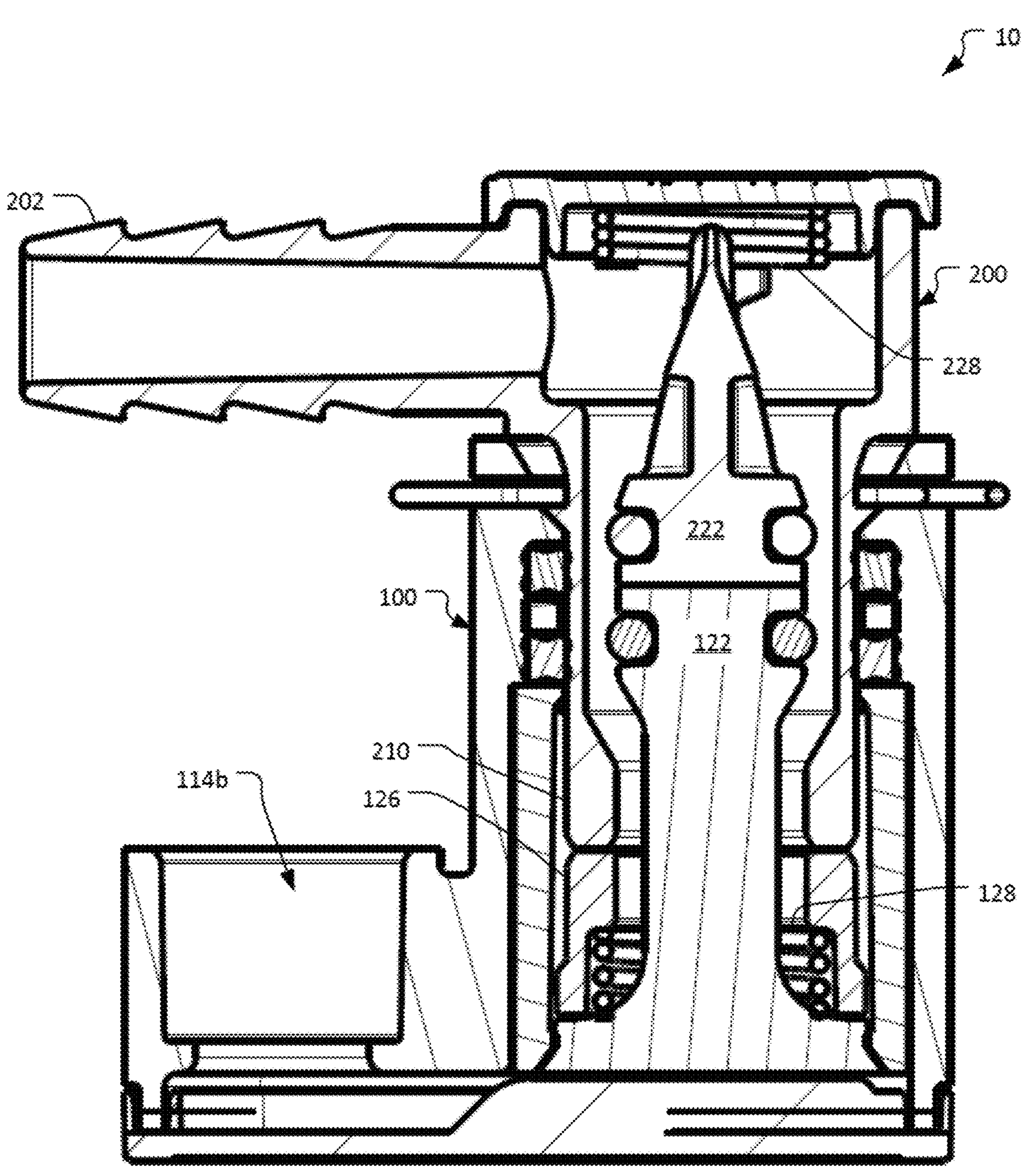
FIG. 4 is a longitudinal cross-sectional view of the fluid coupling assembly of FIG. 1 arranged in the operable coupled configuration.
Figure 7:
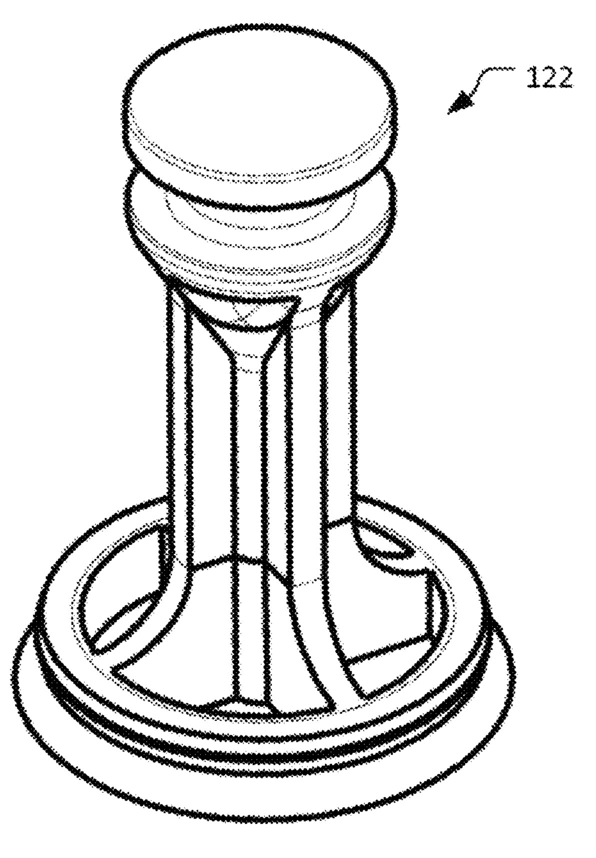
FIG. 7 is a perspective view of an example valve stem of the example female fluid coupling device of FIG. 1

The valve assembly 120 is located within the housing's first internal space portion 112*a*. The valve assembly 120 includes a valve stem 122 (see also FIG. 7) and a valve sleeve 126 surrounding the valve stem 122. The valve sleeve 126 is translatable (reconfigurable) along the valve stem 122 (and along the first axis 11*a*) between: (i) a first arrangement (as shown in FIG. 4) in which a fluid flow path between the first end opening 114*a* and second end opening 114*b* is open, and (ii) a second arrangement (as shown in FIG. 2) in which the valve assembly 120 blocks the fluid flow path. The valve assembly 120 also includes a spring 128 that spring-biases the valve sleeve 126 to the second arrangement (closed arrangement).

Figure 6:
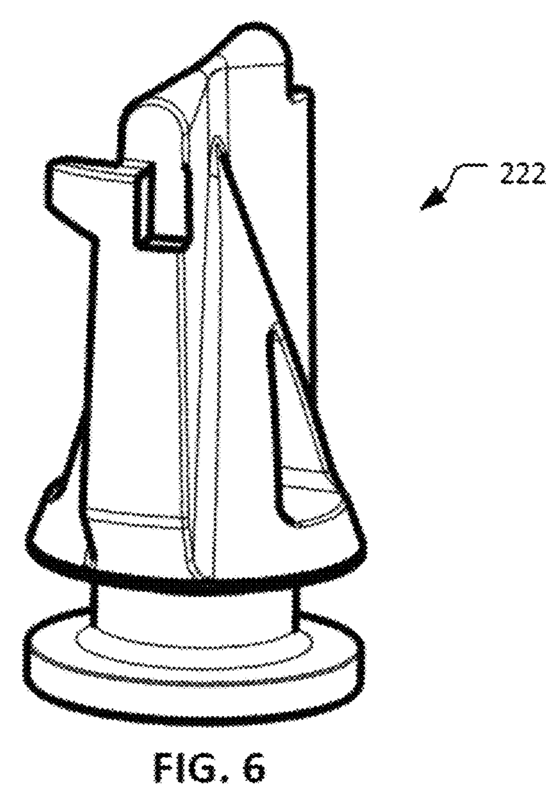
FIG. 6 is a perspective view of an example valve member of the example male fluid coupling device of FIG. 1

The male coupling device 200 includes the valve assembly 220 within the housing's internal space 212. The valve assembly 220 includes a valve member 222 (see also FIG. 6) and a spring 228. The valve member 222 is translatable (reconfigurable) within the internal space 212 between: (i) a first arrangement (as shown in FIG. 4) in which a fluid flow path through the male coupling device 200 is open, and (ii) a second arrangement (as shown in FIG. 2) in which the valve assembly 220 blocks the fluid flow path through the male coupling device 200. The 228 spring-biases the valve member 222 to the second arrangement (closed arrangement). When the valve member 222 is in its open arrangement, the fluid flow path through the male coupling device 200 is "L-shaped" in the depicted embodiment (without limitation).

The female coupling device 100 includes multiple seals, e.g., a first seal disposed between the valve stem 122 and the valve sleeve 126 (when the valve sleeve 126 is in its closed arrangement), a second seal disposed between the valve sleeve 126 and the interior wall of the first housing portion 110*a* (when the valve sleeve 126 is in its closed arrangement), and a third seal that becomes disposed between the interior wall of the first housing portion 110*a* and an exterior wall of the housing 210 of the male coupling device 200 when the female coupling device 100 and the male coupling device 200 are partially and/or fully coupled together.

The male coupling device 200 includes a seal disposed between the valve member 222 and the interior wall of the housing 210 (when the valve member 222 is in its closed arrangement).

Figure 3:
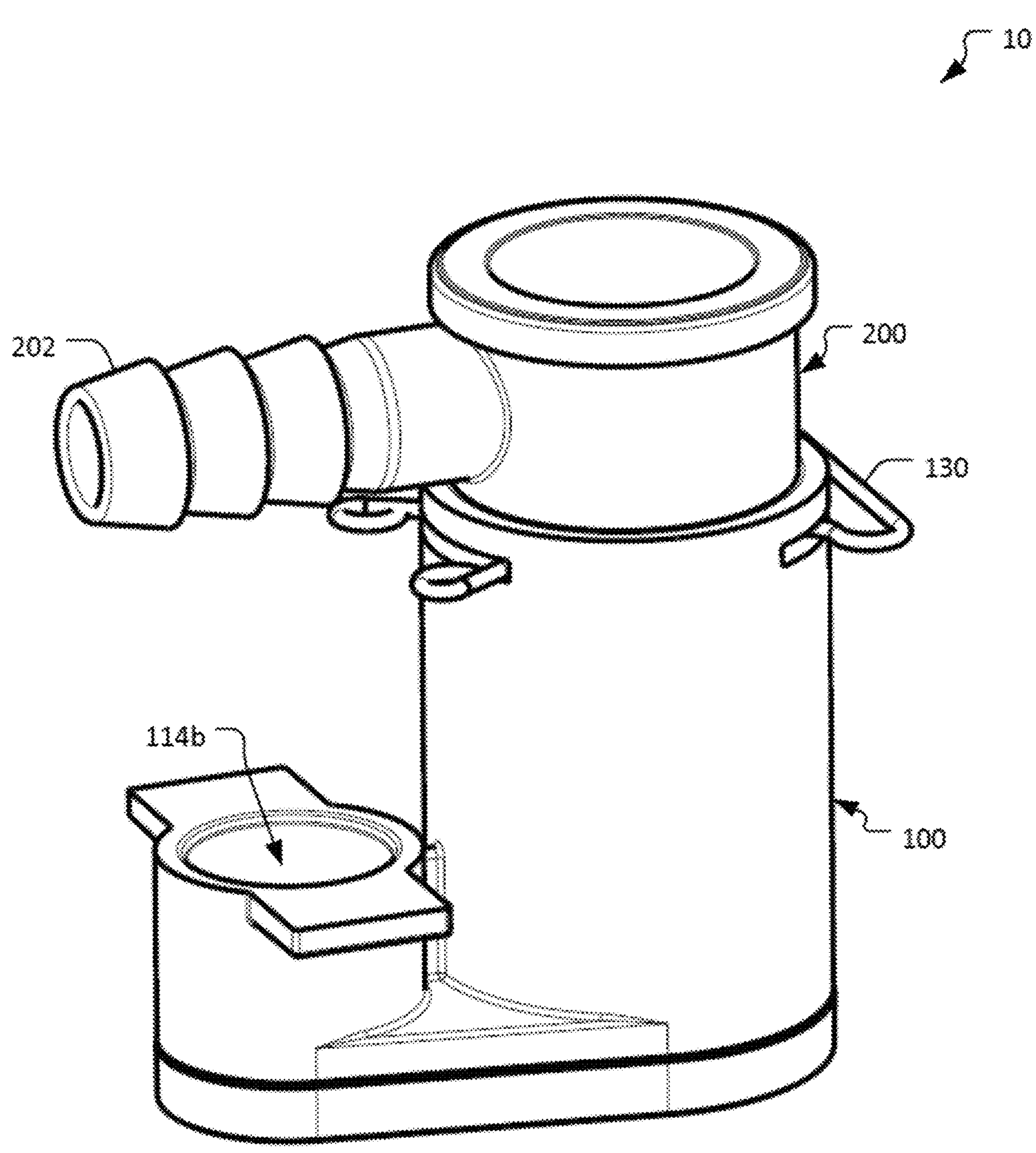
FIG. 3 is a perspective view of the fluid coupling assembly of FIG. 1 arranged in an operable coupled configuration.

FIG. 3 shows the fluid coupling system 10 in its operative configuration (or fully coupled configuration) in which the female coupling device 100 and the male coupling device 200 are releasably coupled to each other to create an open fluid flow path through the fluid coupling system 10 (i.e., between the opening defined by the termination 202 and the second end opening 114*b*).

The female coupling device 100 also includes a latch member 130 (e.g., a wire clip or retainer). The latch member 130 engages into a circumferential groove 214 (see FIG. 2) to releasably latch the female coupling device 100 and the male coupling device 200 together in the operative configuration. To uncouple the female coupling device 100 and the male coupling device 200, the latch member 130 can be manually disengaged from the circumferential groove 214 by pulling the latch member 130 outwardly away from the housing 110 of the female coupling device 100. Alternatively, in some embodiments another type of latching mechanism can be used instead of the latch member 130. Some such latching mechanisms can include spring-loaded clips that are a part of the female coupling device 100, and that are manually depressible to uncouple the female coupling device 100 and the male coupling device 200. Such a spring-loaded clip can be releasably engaged in the circumferential groove 214 of the male coupling device 200, and then become disengaged from the circumferential groove 214 when manually depressed.

FIG. 4 shows a longitudinal cross-sectional view of the female coupling device 100 and the male coupling device 200 with the fluid coupling system 10 in its operative configuration in which the female coupling device 100 and the male coupling device 200 are releasably coupled to each other to create an open fluid flow path through the fluid coupling system 10 (i.e., between the opening defined by the termination 202 and the second end opening 114*b*). In these views, it can be seen that the valve sleeve 126 of the female coupling device 100 and the valve member 222 of the male coupling device 200 are in their first, open arrangements.

To arrive at the depicted coupled arrangement (as compared to the uncoupled arrangement of FIG. 2), as the housing 210 of the male coupling device 200 was inserted into the first end opening 114*a* of the female coupling device 100, the face of the valve stem 122 pushed the valve member 222 against its spring 228 to its open position, and the end face of the housing 210 pushed the valve sleeve 126 against its spring 128 to its open position. The second and third seals of the female coupling device 100 seal against the exterior wall of the housing 210 of the male coupling device 200.

During the process of coupling the female coupling device 100 and the male coupling device 200, the multiple seals of the couplings function to reduce or eliminate the potential for air inclusion during the coupling process. In addition, the multiple seals of the couplings function to reduce or eliminate the potential for fluid spillage during the uncoupling process. The placement and function of the seals are illustrated and described, for example, in U.S. Pat. Nos. 11,067,210, 11,060,650, and U.S. patent application Ser. No. 16/670,294 (which are hereby incorporated herein by reference in their entireties).

Figure 5:
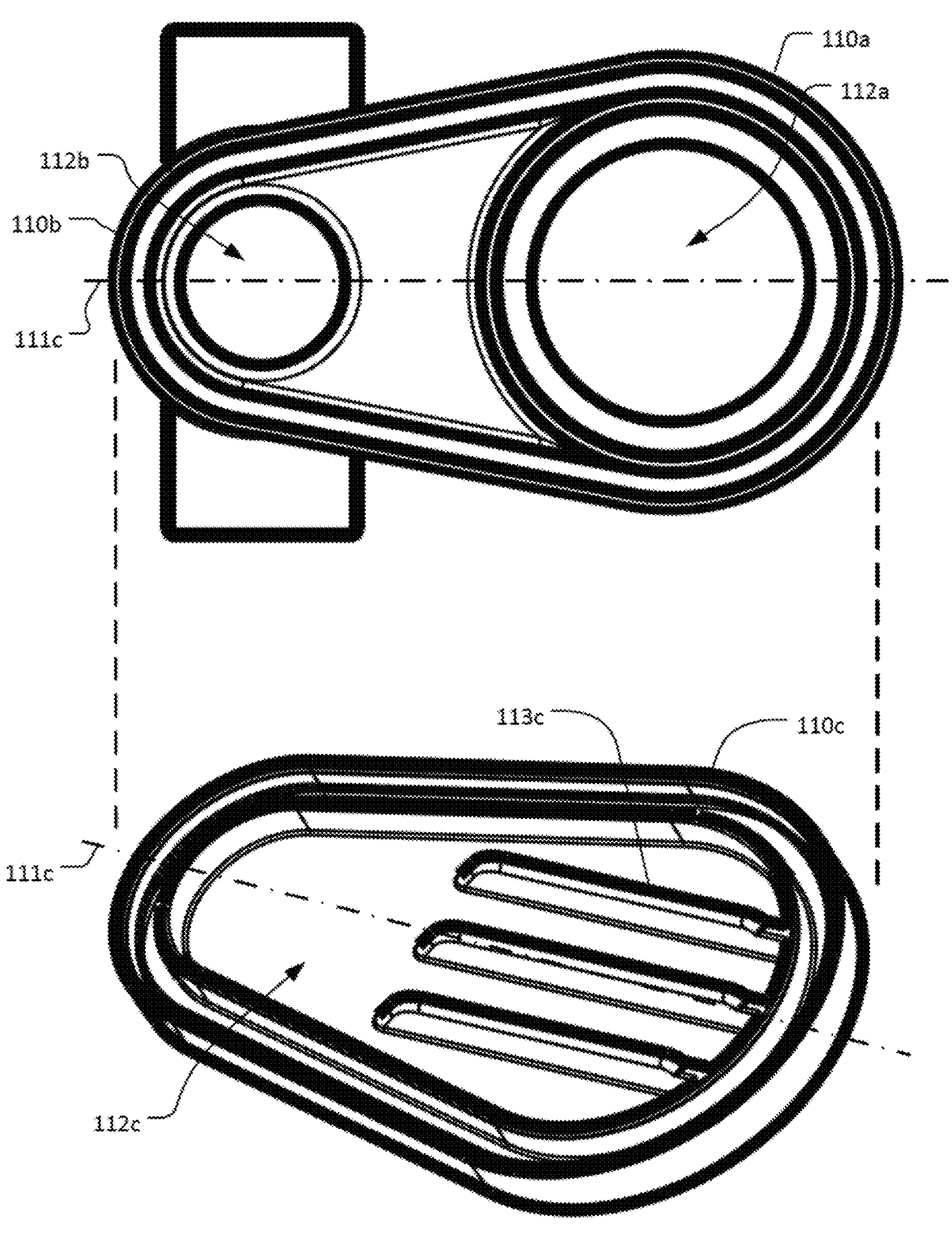
FIG. 5 is an exploded view of an end portion of the example female coupling device of FIG. 1.

FIG. 5 shows an exploded view of the third internal space portion 112$c$ of the female coupling device 100. It can be seen that the third internal space portion 112$c$ is flat and wide. This flat and wide configuration of the third internal space portion 112$c$, and the fact that the third internal space portion 112$c$ interconnects the first internal space portion 112$a$ to the second internal space portion 112$b$, advantageously enables the female coupling device 100 to have a compact, low profile.

It can be seen that, in the depicted embodiment, a cross-section of the third internal space portion 112$c$ taken orthogonally to the third axis 111$c$ (i.e., the direction of the fluid flow path) is oblong or rectangular. In some embodiments, a ratio of the width dimension to the height dimension of the third internal space portion 112$c$ taken orthogonally to the third axis 111$c$ is in a range of 8:1 to 12:1, or 6:1 to 10:1, or 4:1 to 8:1, or 9:1 to 14:1, without limitation. Moreover, an area of the oblong/rectangular cross-section of the third internal space 111$c$ decreases along a direction from an end of the third housing portion 110$c$ that is connected to the first housing portion 110$a$ to an end of the third housing portion 110$c$ that is connected to the second housing portion 110$b$. The third housing portion 110$c$ includes one or more ribs 113$c$ within the third internal space portion 112$c$ that can support the valve stem 122 and/or that can provide guidance for fluid flow through the third internal space portion 112$c$.

Figure 8:
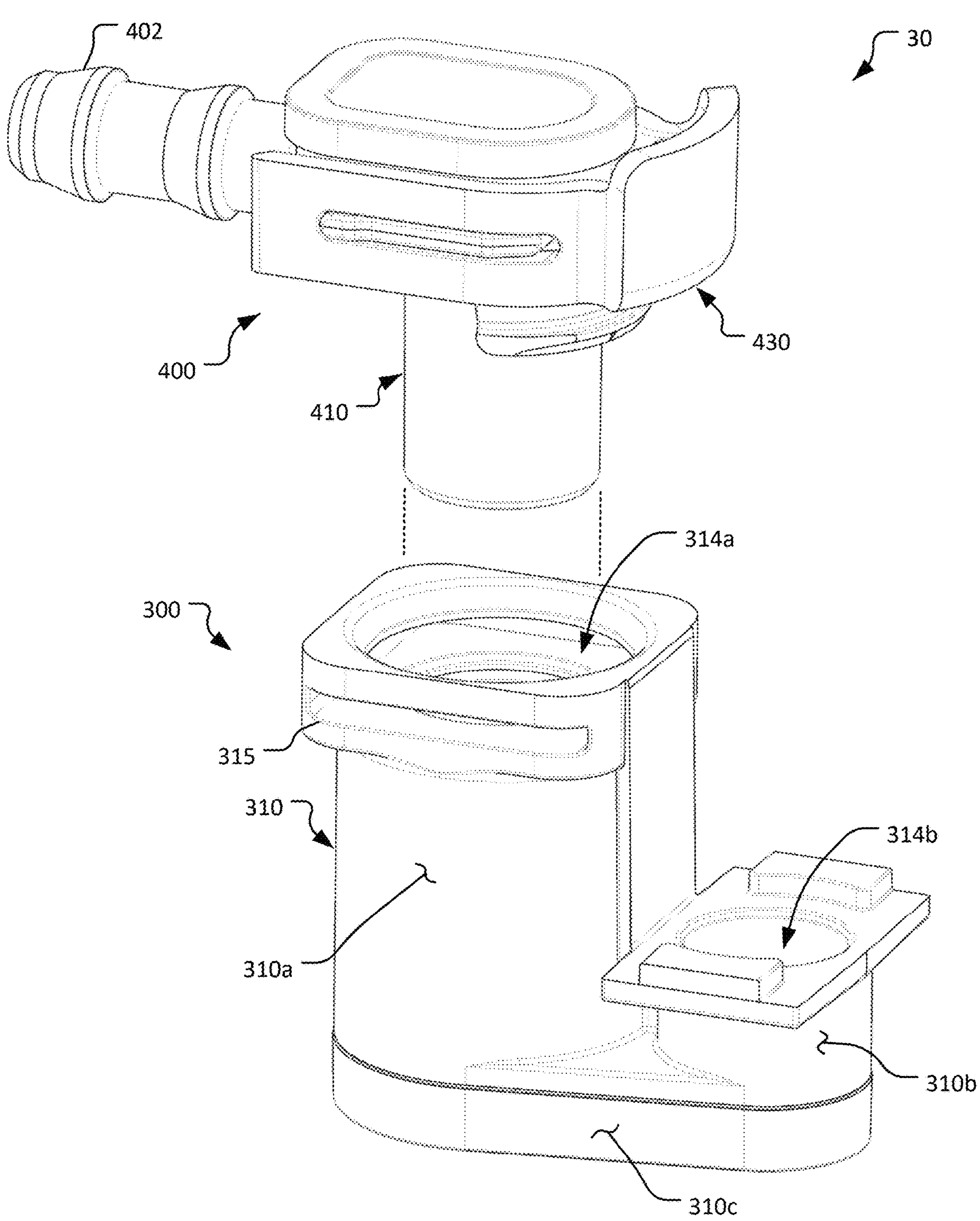
FIG. 8 is a perspective view of another fluid coupling assembly including another example male fluid coupling device and another example female coupling device arranged in a separated configuration, in accordance with some embodiments provided herein.

FIG. 8 depicts another example fluid coupling system. As shown, some example embodiments of the fluid coupling system 30 include a female coupling device 300 and a male coupling device 400 that are releasably coupleable to each other. The female coupling device 300 may also be referred to as a body 300 or a first fluid coupling device 300. The male coupling device 400 may also be referred to as an insert 400 or a second fluid coupling device 400.

The female coupling device 300 includes a housing 310. The housing 310 includes a first housing portion 310$a$, a second housing portion 310$b$, and a third housing portion 310$c$. Each of the housing portions 310$a$-$c$ defines an internal space.

The third housing portion 310$c$ is coupled to the first housing portion 310$a$ and to the second housing portion 310$b$. The third housing portion 310$c$ extends between the first housing portion 310$a$ and the second housing portion 310$b$. The third housing portion 310$c$ is disposed at a closed end of the fluid coupling device 300.

The male coupling device 400 includes a housing 410.

The first housing portion 310$a$ defines a first end opening 314$a$. The second housing portion 310$b$ defines a second end opening 314$b$. In the depicted embodiment, the first end opening 314$a$ and the second end opening 314$b$ both face in a same direction away from the third housing portion 310$c$ (which is a closed end of the fluid coupling device 300).

Figure 9:
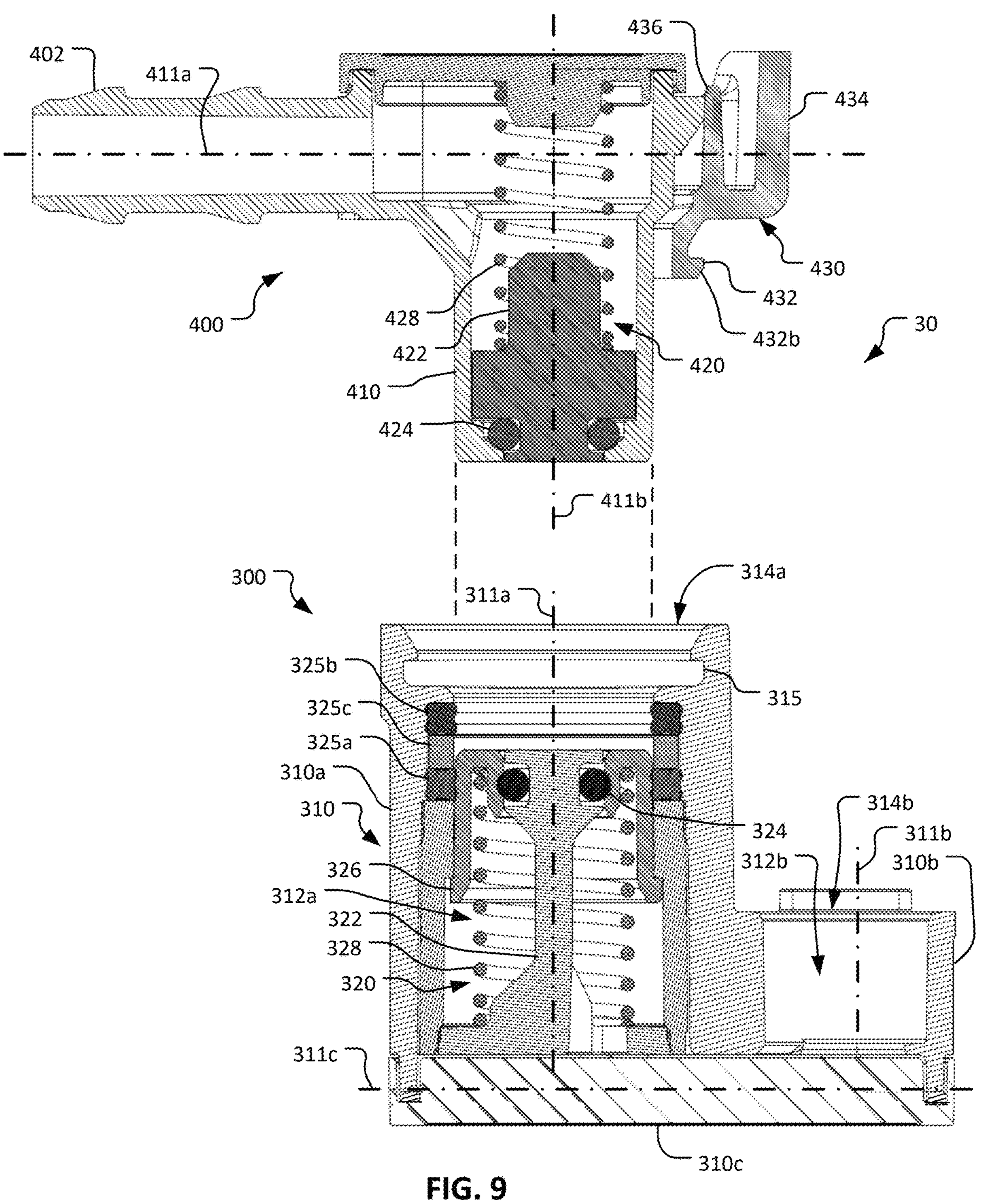
FIG. 9 is a longitudinal cross-sectional view of the fluid coupling assembly of FIG. 8.
Figure 10:
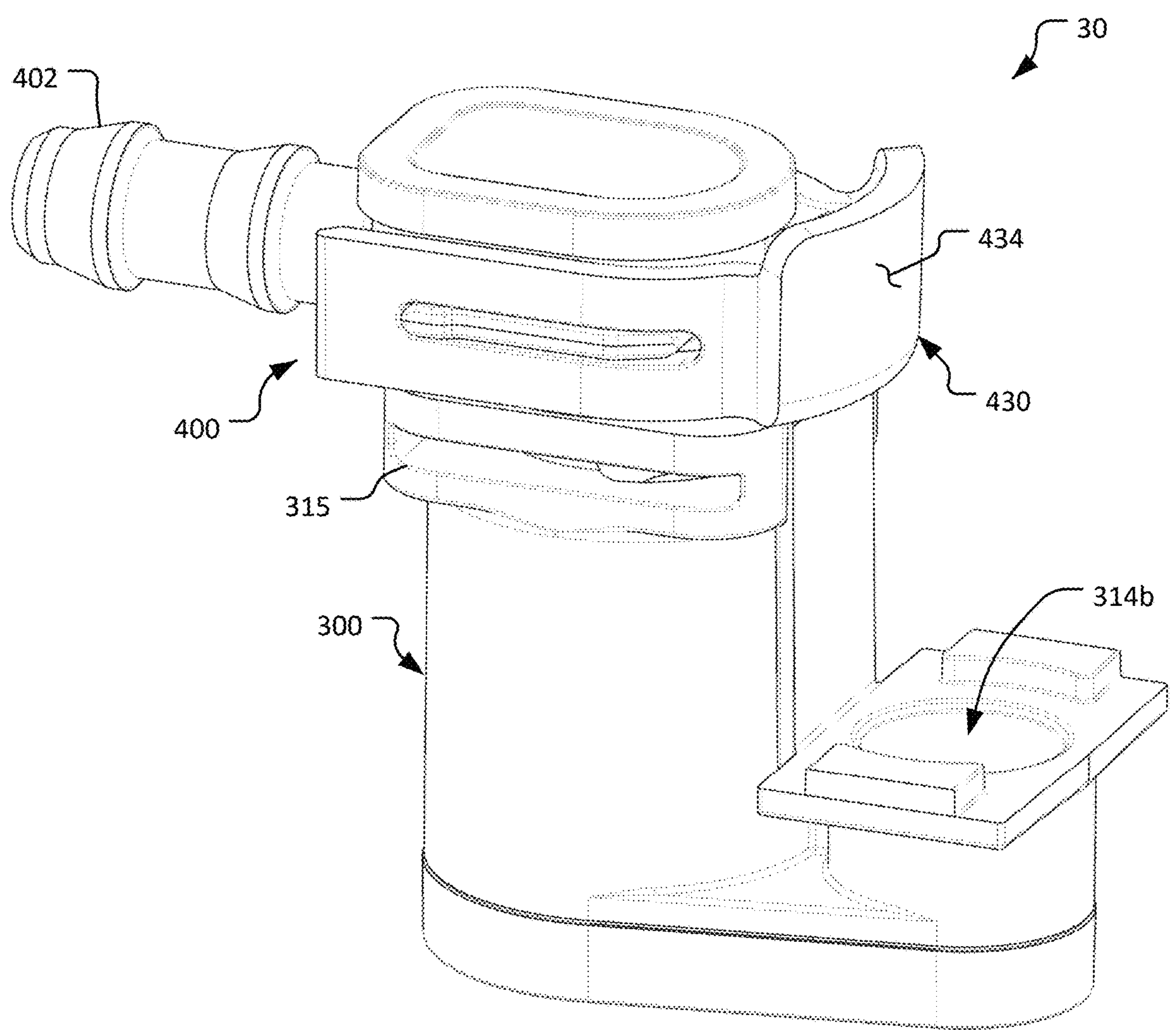
FIG. 10 is a perspective view of the fluid coupling assembly of FIG. 8 arranged in an operable coupled configuration.
Figure 11:
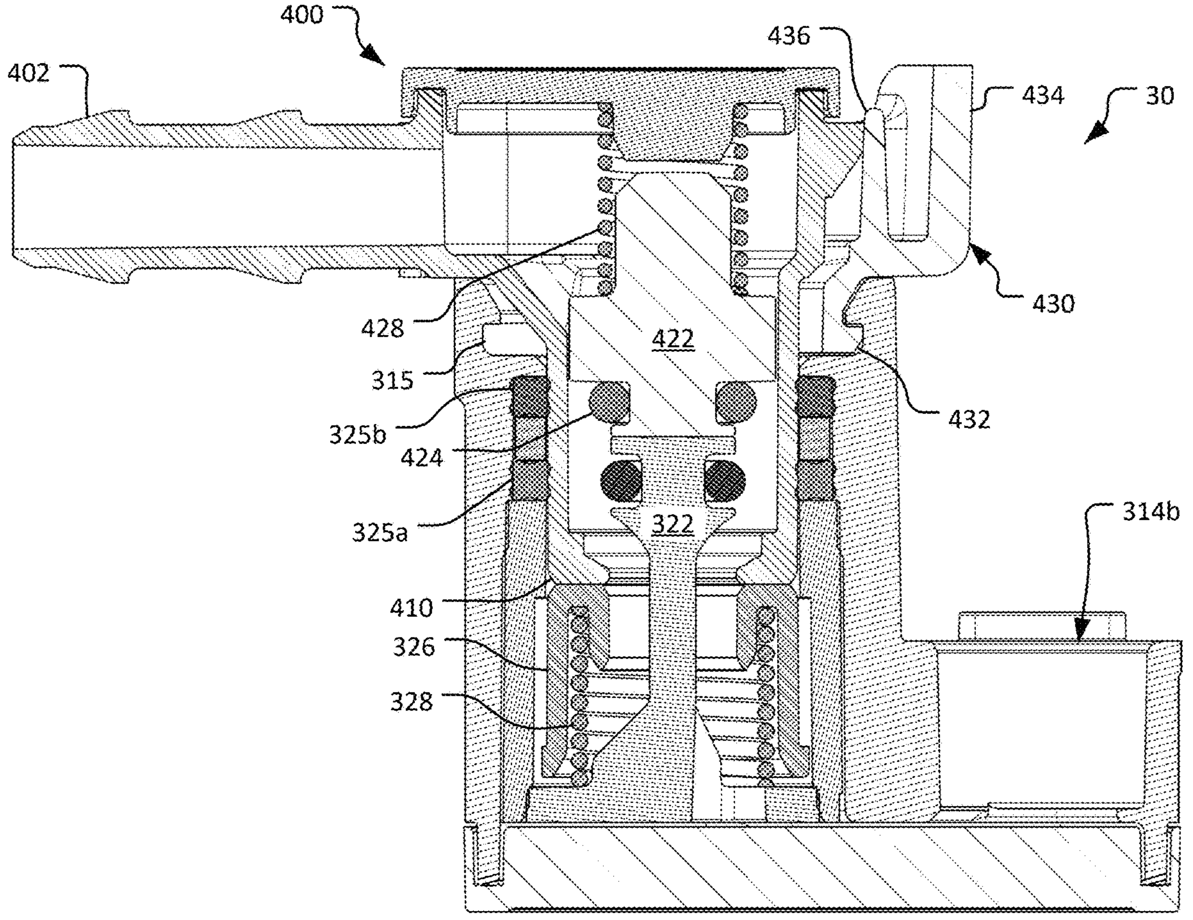
FIG. 11 is a longitudinal cross-sectional view of the fluid coupling assembly of FIG. 8 arranged in the operable coupled configuration.

The first end opening 314$a$ is configured to receive a portion of the housing 410 of the male coupling device 400 when the female coupling device 300 and the male coupling device 400 are releasably coupled to each other in an operable configuration that creates an open fluid flow path through the female coupling device 300 and the male coupling device 400 (e.g., as shown in FIGS. 10 and 11). When the female coupling device 300 and the male coupling device 400 are uncoupled from each other (as shown in FIGS. 8 and 9) there is no open fluid flow path through either of the female coupling device 300 or the male coupling device 400. That is the case because each of the female coupling device 300 and the male coupling device 400 have internal valves that are biased to closed arrangements (as described further below).

The second end opening 314$b$ of the female coupling device 300 is a connection point (or "termination" 314$b$) that can be used to couple the female coupling device 300 to various types of fluid-carrying members (e.g., a tube, a manifold, a pipe, a rail, a fitting, etc.). In the depicted embodiment, the second end opening 314$b$ is simply an open port. In some embodiments, an adapter (e.g., a nipple, a spud, a threaded portion, a hose barb, a compression fitting, etc.) can be used to connect the chosen type of fluid-carrying member to the female coupling device 300 via the second end opening 314$b$.

The male coupling device 400 includes a connection point 402 (or "termination" 402) that can be used to couple the male coupling device 400 to various types of fluid-carrying members (e.g., a tube, a manifold, a pipe, a rail, a fitting, etc.). In the depicted embodiment, the connection point 402 is a barbed termination. In other embodiments, the connection point 402 can be any other type of termination such as, but not limited to, a threaded portion, a compression fitting, a sanitary fitting, a luer fitting, and the like, without limitation).

While the termination 314$b$ of the female coupling device 300 is depicted as an open port, and the termination 402 of the male coupling device 400 is depicted as a barbed connection, it should be understood that the female coupling device 300 and/or the male coupling device 400 can have any type of connections/terminations such as, but not limited to, threaded connections, elbows, tees, sanitary fittings, compression fittings, and the like, and combinations thereof.

The individual components (e.g., bodies, valve members, springs, seals, etc.) of the fluid coupling assembly 30 can be configured like any of the variations, and made of any of the materials, as described above regarding the fluid coupling assembly 10.

In some embodiments, the couplings 300 and 400, or portions thereof, can be constructed from a color-changing material (e.g., a thermochromic polymer) that is responsive to temperature. Accordingly, the color of such a coupling can provide an indication of the temperature of the fluid inside of the coupling. In some embodiments, other techniques for indicating the temperature of the fluid can be used such as, but not limited to, color-changing adhesive labels applied to an outer surface of the coupling(s).

It should be understood that the components of the fluid coupling system 30 (e.g., the female coupling device 300 and the male coupling device 400) are scalable to virtually any desired size. Accordingly, the fluid coupling system 30 can be scaled to connect a wide range of different conduits or tubing sizes from very small conduits/tubing (e.g., 3 mm in diameter or smaller) to very large conduits/tubing (e.g., 50 mm in diameter or larger).

FIG. 9 shows longitudinal cross-sectional views of the female coupling device 300 and the male coupling device 400. In these views, it can be seen that the female coupling device 300 includes a valve assembly 320 and the male coupling device 400 includes a valve assembly 420. In the depicted arrangements, the valve assembly 320 and the valve assembly 420 are each in a closed arrangement in which the valve assembly 320 and the valve assembly 420 block fluid flow through the female coupling device 300 and the male coupling device 400, respectively.

As described above, the female coupling device 300 includes the first housing portion 310*a*, the second housing portion 310*b*, and the third housing portion 310*c*. Now in FIG. 9, it can be seen that the first housing portion 310*a* defines a first internal space portion 312*a* that extends along a first axis 311*a*. The second housing portion 310*b* defines a second internal space portion 312*b* that extends along a second axis 311*b*. The third housing portion 310*c* defines a third internal space portion 312*c* that extends along a third axis 311*c* (also refer to FIG. 12). The third internal space portion 312*c* fluidly interconnects the first internal space portion 312*a* and the second internal space portion 312*b*. In other words, when the valve assembly 320 is in its open configuration, the first end opening 314*a* and the second end opening 314*b* are in fluid communication via a series combination of the first internal space portion 312*a*, the second internal space portion 312*b*, and the third internal space portion 312*c*.

It can be seen that in the depicted embodiment, the first axis 311*a* is substantially orthogonal to the third axis 311*c*. In addition, the second axis 311*b* is substantially orthogonal to the third axis 311*c*. Further, in the depicted embodiment the first axis 311*a* and the second axis 311*b* are spaced apart from each other, are substantially parallel to each other, and are each substantially orthogonal to the third axis 311*c*. In other words, when the valve assembly 320 is in its open configuration, it can be said that the fluid flow path between the first end opening 314*a* and the second end opening 314*b* is "U-shaped."

Figure 14:
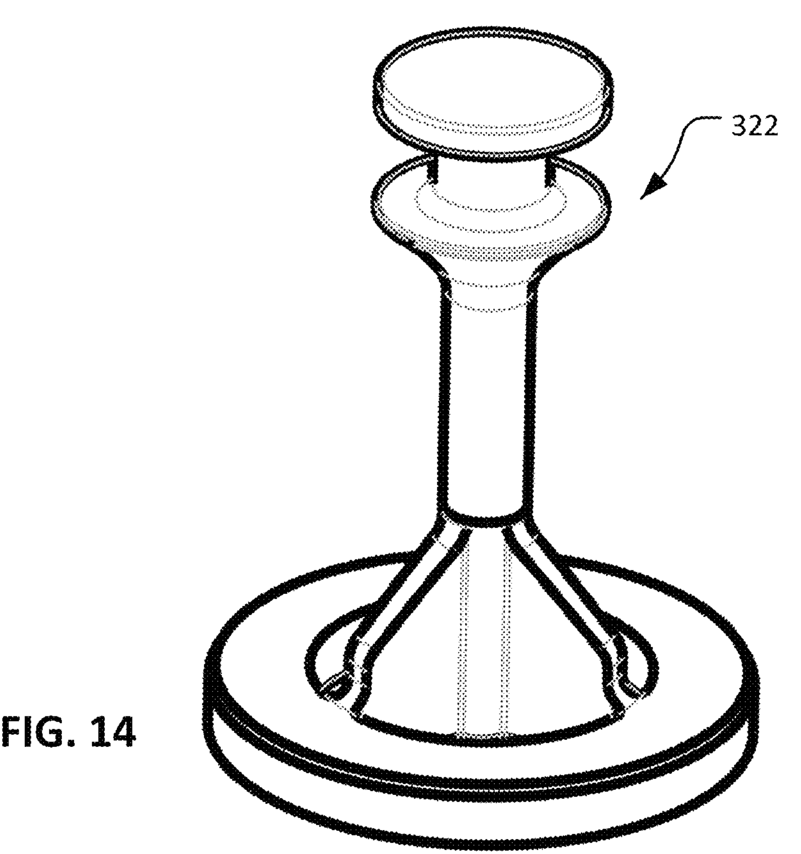
FIG. 14 is a perspective view of an example valve stem of the example female fluid coupling device of FIG. 8.

The valve assembly 320 is located within the housing's first internal space portion 312*a*. The valve assembly 320 includes a valve stem 322 (see also FIG. 14) and a valve sleeve 326 surrounding the valve stem 322. The valve sleeve 326 is translatable (reconfigurable) along the valve stem 322 (and along the first axis 311*a*) between: (i) a first arrangement (as shown in FIG. 11) in which a fluid flow path between the first end opening 314*a* and second end opening 314*b* is open, and (ii) a second arrangement (as shown in FIG. 9) in which the valve assembly 320 blocks the fluid flow path. The valve assembly 320 also includes a spring 328 that extends into an annular pocket defined by the valve sleeve 326 and spring-biases the valve sleeve 326 to the second arrangement (closed arrangement). The valve assembly 320 also includes a seal 324 disposed in a seal recess of the valve stem 322. The seal 324 creates a fluid tight seal between the valve stem 322 and the valve sleeve 326 when the valve sleeve 326 is in its second arrangement in which the fluid flow path is blocked.

Figure 13:
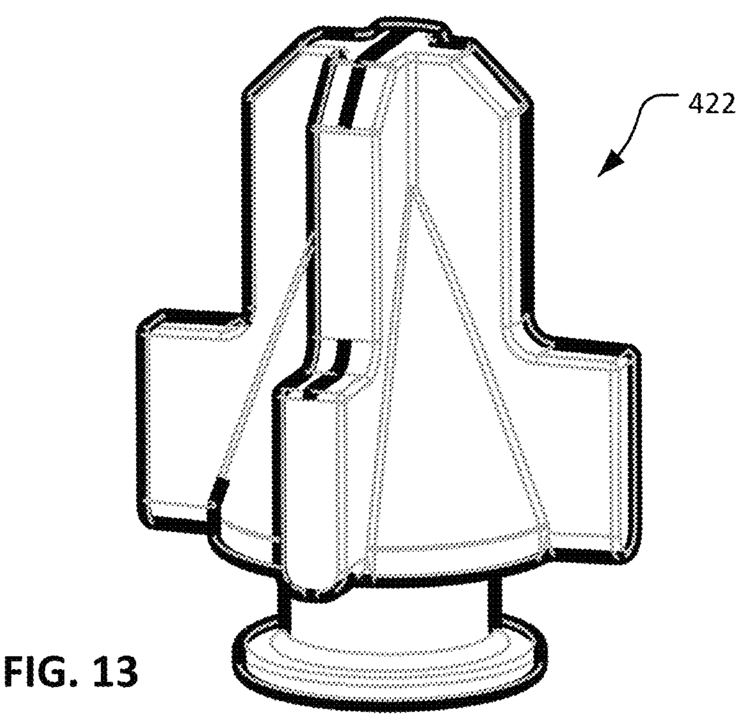
FIG. 13 is a perspective view of an example valve member of the example male fluid coupling device of FIG. 8.

The male coupling device 400 includes the valve assembly 420 within the housing's internal space 412. The valve assembly 420 includes a valve member 422 (see also FIG. 13), a seal 424, and a spring 428. The valve member 422 is translatable (reconfigurable) within the internal space 412 between: (i) a first arrangement (as shown in FIG. 11) in which a fluid flow path through the male coupling device 400 is open, and (ii) a second arrangement (as shown in FIG. 9) in which the valve assembly 420 blocks the fluid flow path through the male coupling device 400. The 428 spring-biases the valve member 422 to the second arrangement (closed arrangement). The seal 424 is disposed in a seal recess of the valve member 422. The seal 424 creates a fluid tight seal between the valve member 422 and the main body 410 when the valve member 422 is in its second arrangement in which the fluid flow path is blocked. The main body 410 includes an annular sealing surface that is oriented at an angle of about 45° relative to a central longitudinal axis 411*b* along which the valve member 422 translates.

When the valve member 422 is in its open arrangement, the fluid flow path through the male coupling device 400 is "L-shaped" in the depicted embodiment (without limitation). Said another way, the main body 410 defines a first central longitudinal axis 411*a* and a second central longitudinal axis 411*b*. The first central longitudinal axis 411*a* is substantially perpendicular to the second central longitudinal axis 411*b*.

The female coupling device 300 includes multiple seals, e.g., the seal 324 disposed between the valve stem 322 and the valve sleeve 326 (when the valve sleeve 326 is in its closed arrangement), a second seal 325*a* disposed between the valve sleeve 326 and the interior wall of the first housing portion 310*a* (when the valve sleeve 326 is in its closed arrangement), and a third seal 325*b* that becomes disposed between the interior wall of the first housing portion 310*a* and an exterior wall of the housing 410 of the male coupling device 400 when the female coupling device 300 and the male coupling device 400 are partially and/or fully coupled together. A spacer 325*c* is disposed between the seals 325*a-b*.

FIG. 10 shows the fluid coupling system 30 in its operative configuration (or fully coupled configuration) in which the female coupling device 300 and the male coupling device 400 are releasably coupled to each other to create an open fluid flow path through the fluid coupling system 30 (i.e., between the opening defined by the termination 402 and the second end opening 314*b*).

Figure 16:
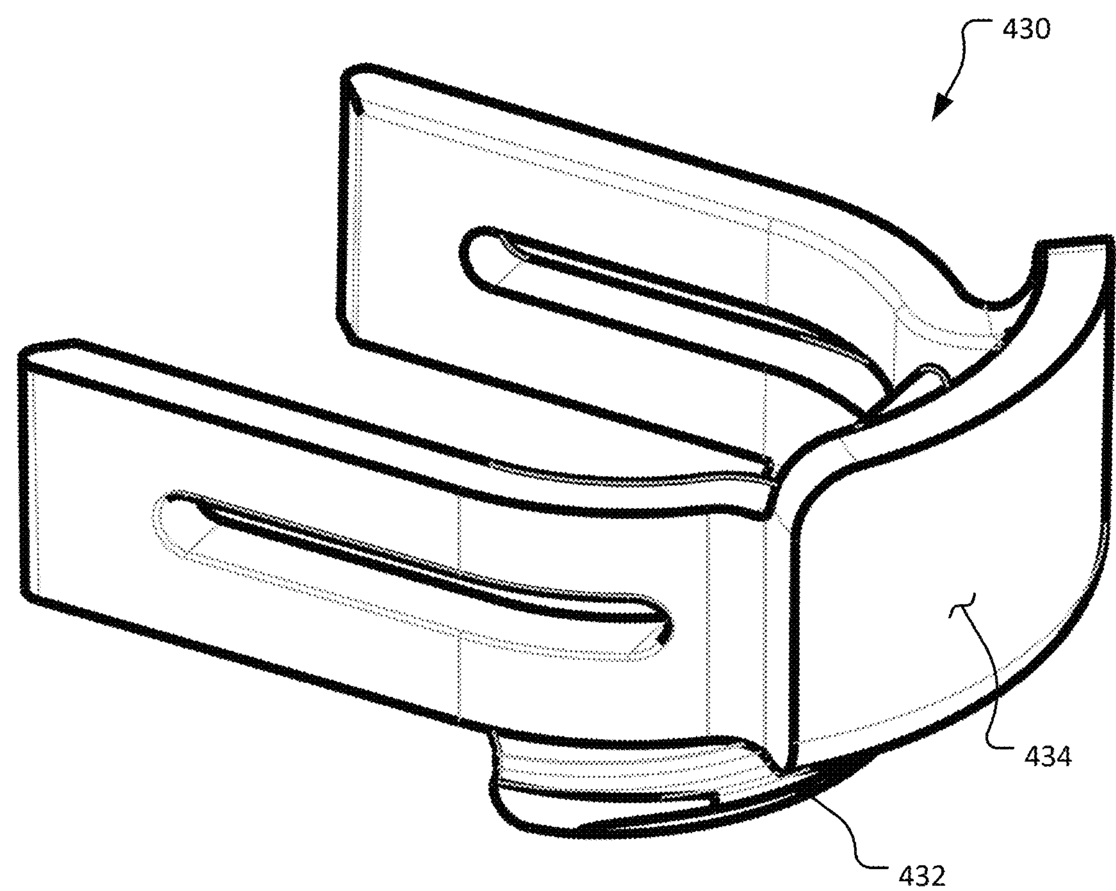
FIGS. 16-18 are perspective views of a latch member of the example male fluid coupling device of FIG. 8.
Figures 17, 18:
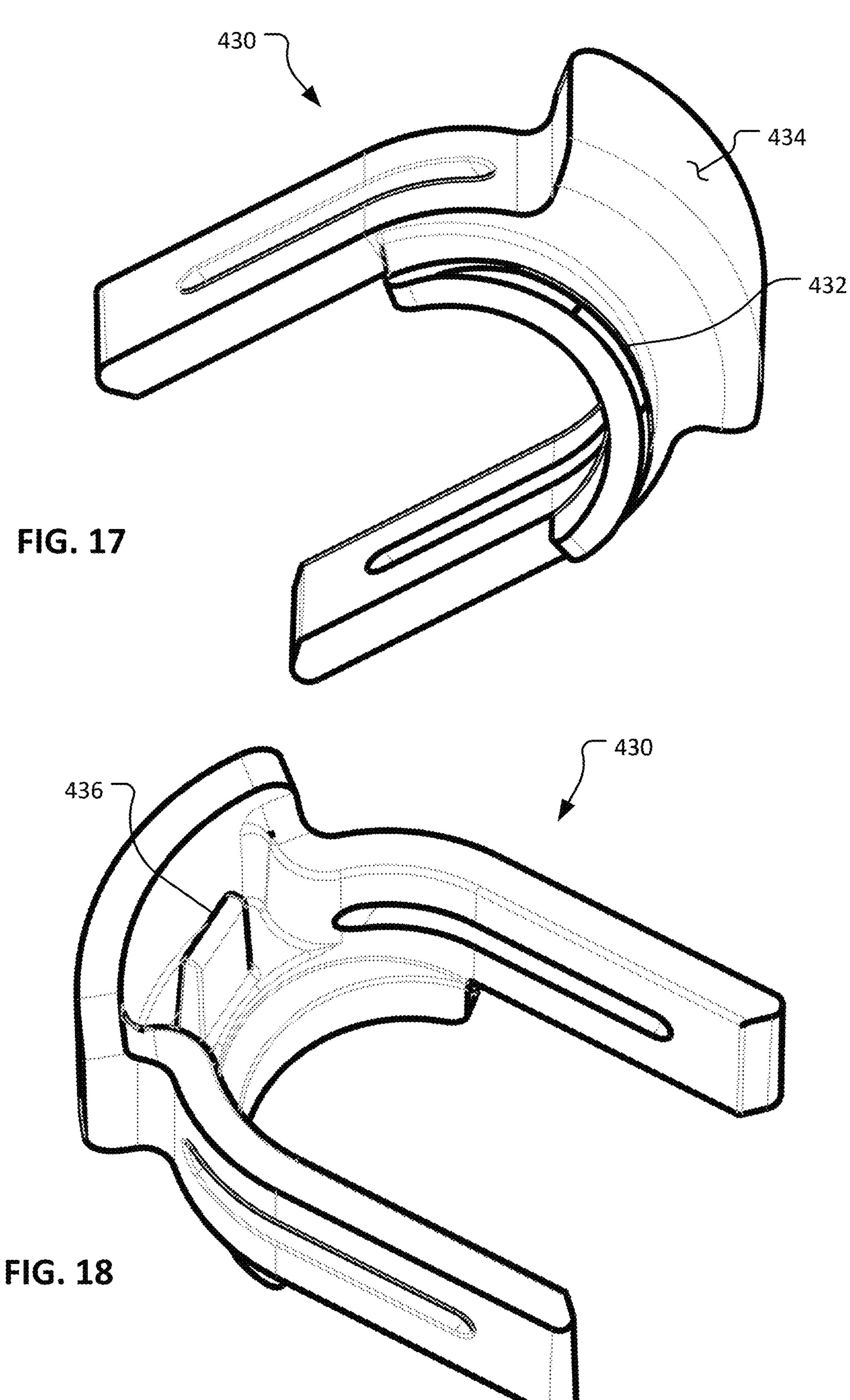

The male coupling device 400 also includes a latch member 430 (also see FIGS. 16-18) that is movably coupled to the housing 410. The latch member 430 is movable (translatable or slidable) relative to the housing 410 along the first central longitudinal axis 411*a* (FIG. 9). The latch member 430 can be moved toward the housing 410 by manually depressing a surface 434. The latch member 430 also includes a biasing member 436. In the depicted embodiment, the biasing member 436 is a flexible cantilevered member that abuts the housing 410. In some embodiments, the biasing member 436 can be a coil spring or a torsion spring. When a force is exerted on the surface 434, the biasing member 436 is caused to elastically deflect. When the force is discontinued, the biasing member 436 springs back so that the latch member 430 moves away from the housing 410 to its default position (e.g., as shown in FIGS. 8 and 9).

The latch member 430 includes an arcuate projection 432 is releasably engageable with a circumferential groove 315 defined by the first housing portion 310*a* of the female coupling device 300 to releasably latch the female coupling device 300 and the male coupling device 400 together in the operative configuration.

During the process of coupling the male coupling device 400 and the female coupling device 300 (by moving the male coupling device 400 and the female coupling device 300 toward each other), a beveled edge 432*b* (FIG. 9) of the arcuate projection 432 will come into contact with an annular beveled surface surrounding the first end opening 314*a* of the female coupling device 300. The contact between the bevels will cause the latch member 430 to be forced toward the housing 410 as the male coupling device 400 and the female coupling device 300 are pushed toward each other. This also loads the biasing member 436. As the male coupling device 400 and the female coupling device 300 are pushed farther together, the biasing member 436 will cause the arcuate projection 432 to snap into engagement with the circumferential groove 315. This latches the male coupling device 400 and the female coupling device 300 is the fully operational, coupled arrangement in which the valves 320 and 420 are open and a flow path is opened through the fluid coupling system 30 (i.e., between the opening defined by the termination 402 and the second end opening 314*b*). While the male coupling device 400 and the female coupling device 300 remain latched together, the male coupling device 400 can be rotated 360° around the first axis 311*a* relative to the female coupling device 300 to obtain any desired configuration of the fluid coupling system 30.

The arcuate projection 432 extends less than 1800 around the central longitudinal axis 411*b*. To uncouple the female coupling device 300 and the male coupling device 400, the latch member 430 can be manually disengaged from the circumferential groove 315 by pushing the surface 434 of the latch member 430 toward from the housing 310 of the female coupling device 300. This disengages the arcuate projection 432 from the circumferential groove 315. The male coupling device 400 can then be separated from the female coupling device 300. The springs 328 and 428 will naturally assist with the separation of the male coupling device 400 and the female coupling device 300.

FIG. 11 shows a longitudinal cross-sectional view of the female coupling device 300 and the male coupling device 400 with the fluid coupling system 30 in its operative configuration in which the female coupling device 300 and the male coupling device 400 are releasably coupled to each other to create an open fluid flow path through the fluid coupling system 30 (i.e., between the opening defined by the termination 402 and the second end opening 314*b*). In these views, it can be seen that the valve sleeve 326 of the female coupling device 300 and the valve member 422 of the male coupling device 400 are in their first, open arrangements.

To arrive at the depicted coupled arrangement (as compared to the uncoupled arrangement of FIG. 9), as the housing 410 of the male coupling device 400 was inserted into the first end opening 314*a* of the female coupling device 300, the face of the valve stem 322 pushed the valve member 422 against its spring 428 to its open position, and the end face of the housing 410 pushed the valve sleeve 326 against its spring 328 to its open position. The second seal 325*a* and the third seal 325*b* of the female coupling device 300 seal against the exterior wall of the housing 410 of the male coupling device 400.

During the process of coupling the female coupling device 300 and the male coupling device 400, the multiple seals of the coupling devices 300 and 400 function to reduce or eliminate the potential for air inclusion during the coupling process. In addition, the multiple seals of the coupling devices 300 and 400 function to reduce or eliminate the potential for fluid spillage during the uncoupling process. The placement and function of the seals are illustrated and described, for example, in U.S. Pat. Nos. 11,067,210, 11,060,650, and U.S. patent application Ser. No. 16/670,294 (which are hereby incorporated herein by reference in their entireties).

Figure 12:
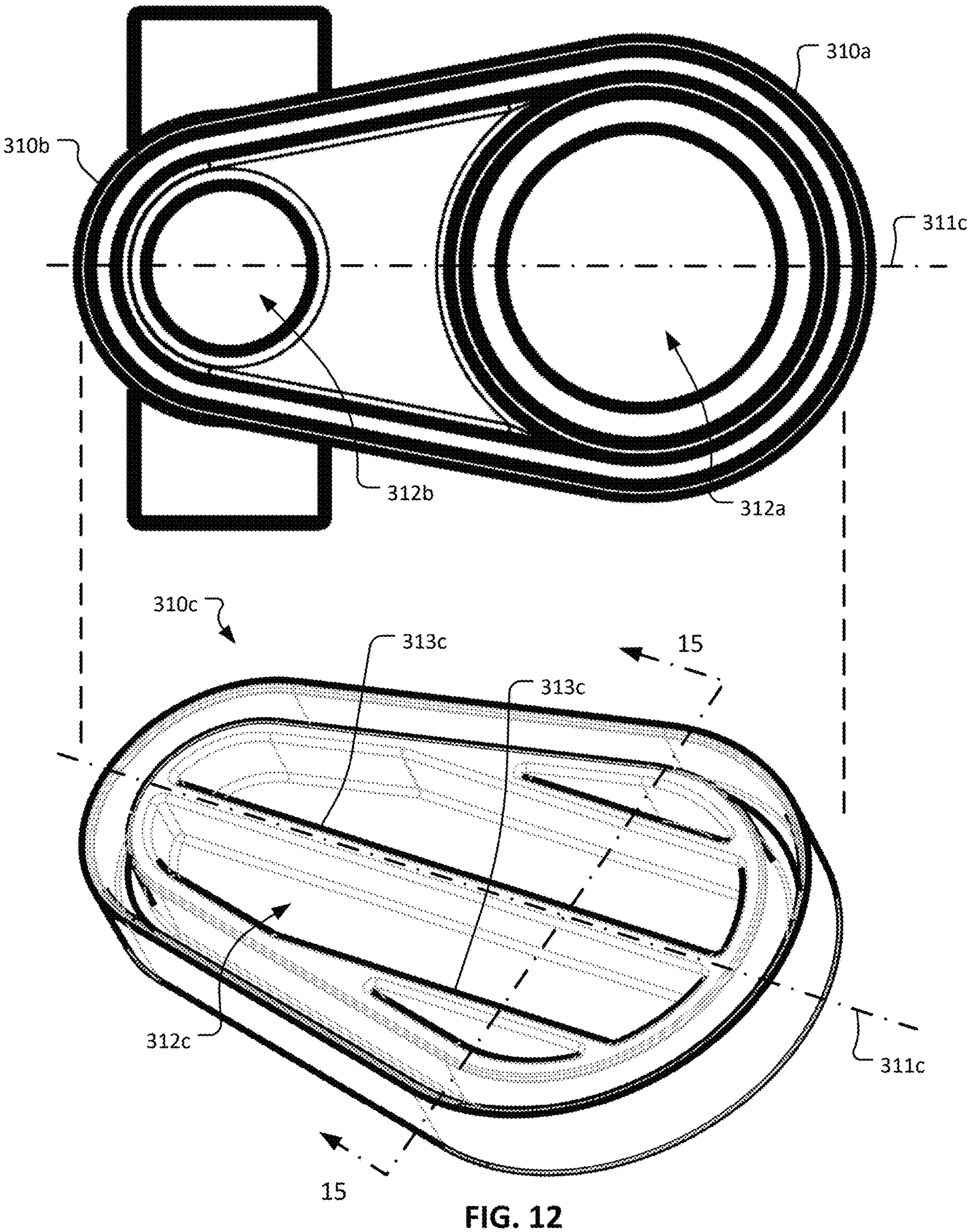
FIG. 12 is an exploded view of an end portion of the example female coupling device of FIG. 8.

FIG. 12 shows an exploded view of the third internal space portion 312*c* of the female coupling device 300. It can be seen that the third internal space portion 312*c* is flat and wide. This flat and wide configuration of the third internal space portion 312*c*, and the fact that the third internal space portion 312*c* interconnects the first internal space portion 312*a* to the second internal space portion 312*b*, advantageously enables the female coupling device 300 to have a compact, low profile.

Figure 15:
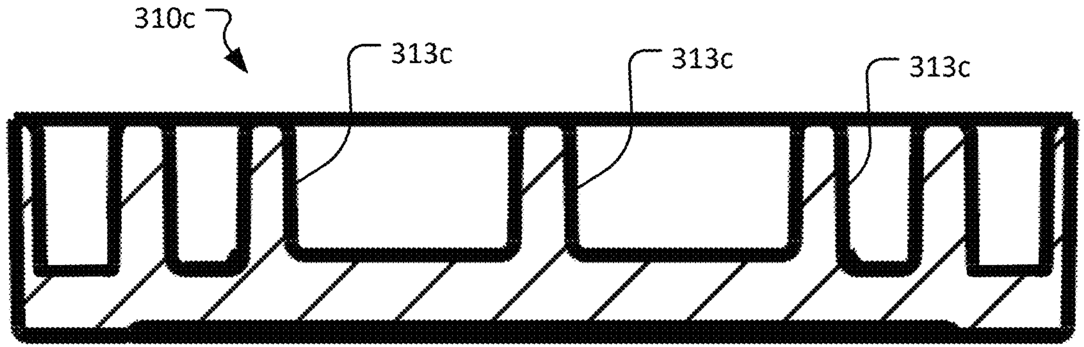
FIG. 15 is a cross-section view of a housing portion of the example female coupling device of FIG. 8.

It can be seen that, in the depicted embodiment, a cross-section 15-15 (see also FIG. 15) of the third internal space portion 312*c* taken orthogonally to the third axis 311*c* (i.e., the direction of the fluid flow path) is oblong or rectangular, with a central rib 313*c*. In some embodiments, a ratio of the width dimension to the height dimension of the third internal space portion 312*c* taken orthogonally to the third axis 311*c* is in a range of 8:1 to 12:1, or 6:1 to 10:1, or 4:1 to 8:1, or 9:1 to 14:1, without limitation. Moreover, an area of the oblong/rectangular cross-section of the third internal space 311*c* decreases along a direction from an end of the third housing portion 310*c* that is connected to the first housing portion 310*a* to an end of the third housing portion 310*c* that is connected to the second housing portion 310*b*. The third housing portion 310*c* includes one or more ribs 313*c* within the third internal space portion 312*c* that can support the valve stem 322, increase the bending resistance of the third housing portion 310*c*, and/or that can provide guidance for fluid flow through the third internal space portion 312*c*.

Axes that are said to be substantially perpendicular or orthogonal to each other means that the axes define an angle of 90°+/−5° or 900+/−10°. Axes that are said to be substantially parallel to each other means that the axes define an angle of 0°+/−5° or 0°+/−10°. When an angle is said to be "about" X° (a certain number of degrees), that means a tolerance of X°+/−5° or X°+/−10°.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system modules and components in the embodiments described herein should not be understood as requiring such separation in all embodiments.

What is claimed is:

1. A fluid coupling system for liquid cooling of computer electronics, comprising:

a female coupling device defining an internal space and comprising:

a first housing portion that defines a front opening into the internal space of the female coupling device;

a second housing portion that defines rear opening into the internal space of the female coupling device, the rear opening being positioned closer to a rearmost end of the female coupling device than to a frontmost end of the female coupling device; and a valve assembly positioned within the internal space of the female coupling device and comprising: a valve stem, a valve sleeve that is movable relative to valve stem, and a valve spring extending rearwardly from the valve sleeve toward a rear end of the valve stem, wherein the valve assembly is adjustable between: (i) a first arrangement in which a fluid flow path between the first and second end openings is open, and (ii) a second arrangement in which the valve assembly blocks the fluid flow path, wherein the rear opening is laterally offset from the valve stem such that the rearmost end of female coupling device is closer to the rear end of the valve stem than to the rear opening.

2. The fluid coupling system of claim 1, wherein the rear end of valve stem has multiple apertures therethrough and defines a maximum outer diameter of the valve stem.

3. The fluid coupling system of claim 2, wherein the second housing portion of the female coupling device includes a rear thread to connect with a fluid-carrying tube for fluid communication with the rear opening.

4. The fluid coupling system of claim 3, wherein valve spring biases the valve sleeve to a forward position so that the valve assembly is in the second arrangement, and wherein the valve sleeve is movable relative to the valve stem to a rearward position so that the valve assembly is in the first arrangement.

5. The fluid coupling system of claim 4, wherein when the valve assembly is adjusted to the first arrangement, the valve sleeve is in the rearward position such that a sleeve front face of the valve sleeve is closer to the rearmost end of female coupling device than to the frontmost end of female coupling device.

6. The fluid coupling system of claim 4, wherein the valve sleeve is movable from the forward position in which the valve sleeve is entirely forward of the rear thread to the rearward position in which at least a position of the valve sleeve is laterally offset from the rear thread.

7. The fluid coupling system of claim 3, wherein e second housing portion is integrally formed as a metallic structure with the first housing portion of the female coupling device.

8. The fluid coupling system of claim 1, wherein the internal space of the female coupling device is at least partially defined by: a first interior bore proximate to the front opening and having a first bore diameter, the first interior bore extending rearwardly for a first bore axial length to an interior shoulder that transitions to a second interior bore having a second bore axial length greater than the first bore axial length and having a second bore diameter larger than the first bore diameter, and forward and rearward seal grooves formed along the first interior bore.

9. The fluid coupling system of claim 8, wherein the rear end of valve stem defines the maximum outer diameter of the valve stem that is larger than the first and second bore diameters of the internal space of the female coupling device.

10. The fluid coupling system of claim 8, wherein the female coupling device further comprises: a forward bore seal seated in the forward seal groove along the first interior bore, and a rear bore seal positioned rearwardly of the forward bore seal in the rear seal groove along the first interior bore, wherein the female coupling device has an overall length of the female coupling device extending in an axial direction from the rearmost end of the female coupling device to a frontmost end of the female coupling device, and the second interior bore the internal space of the female coupling device extends for a majority of the overall length of the female coupling device.

11. The fluid coupling system of claim 10, wherein the valve spring biases the valve sleeve to a forward position so that the valve assembly is in the second arrangement in which a front face of the valve stem is substantially aligned with rear end of the forward seal groove.

12. The fluid coupling system of claim 1, wherein the female coupling device further comprises a color element indicative of a fluid temperature.

13. The fluid coupling system of claim 1, further comprising a male coupling device that is releasably matable to the female coupling device, the male coupling device comprising:

a male housing defining an internal passageway for a fluid flow path;

a valve member within the internal passageway that is spring-biased to a closed position that blocks the fluid flow path through the internal passageway of the male housing.

14. The fluid coupling system of claim 13, wherein the male housing of the male coupling device defines: a front face with a front opening of the male housing leading to the internal passageway; an exterior circumferential surface extending rearward from the front face toward an outwardly ramped surface of an exterior circumferential shoulder; an exterior circumferential groove positioned rearwardly of the outwardly ramped surface of the exterior circumferential shoulder such that the exterior circumferential groove is at least partially defined by a circumferential groove surface positioned rearward of exterior circumferential shoulder; and wherein the internal passageway which has a first bore diameter extending rearward to an interior shoulder transitioning to a larger second bore diameter that extends rearward for a majority of an overall axial length of the male housing.

15. The fluid coupling system of claim 14, wherein the valve member of the male coupling device is longitudinally slidable within the internal passageway of the male main body and configured to abut the interior shoulder of the male housing so that a front end of the valve member substantially aligns with the front face of the male housing.

16. The fluid coupling system of claim 14, wherein the female coupling device further comprises a lock member movable in a sidewall opening of the first housing portion at a position rearward of the front opening of the female coupling device, wherein the lock member is configured to releasably engage with the exterior circumferential groove of the male housing to retain the female coupling device and the male coupling device together a fully coupled configuration.

17. The fluid coupling system of claim 16, wherein the lock member of the female coupling device is manually adjustable to a withdrawn position to disengaged from the male housing so as to uncouple the male fluid coupling device from the female coupling device.

18. The fluid coupling system of claim 17, wherein the lock member of the female coupling device comprises a spring-biased wire rod structure configured to fit in the exterior circumferential groove of the male housing.

19. The fluid coupling system of claim 13, wherein the male coupling device further comprises a rear exterior connection end portion that includes at least one of a threaded or hose barb terminal.

20. The fluid coupling system of claim 19, wherein the internal passageway for the fluid flow path of the male coupling device extends along a first axis and along a second axis, wherein the first and second axes are substantially perpendicular to each other.

* * * * *